United States Patent [19]

Ohta et al.

[11] 4,247,614
[45] Jan. 27, 1981

[54] ELECTROPHOTOGRAPHIC ELEMENT CONTAINING A DISAZO PIGMENT

[75] Inventors: Masafumi Ohta; Kiyoshi Sakai; Mitsuru Hashimoto, all of Numazu; Masaomi Sasaki, Shizuoka; Tomiko Kawakami, Tokyo, all of Japan

[73] Assignee: Ricoh Co., Ltd., Tokyo, Japan

[21] Appl. No.: 95,133

[22] Filed: Nov. 16, 1979

[30] Foreign Application Priority Data

Nov. 20, 1978 [JP] Japan ............................ 53/142274

[51] Int. Cl.³ ............................................. G03G 5/06
[52] U.S. Cl. ....................................... 430/79; 430/72; 430/58; 260/174
[58] Field of Search ........................... 430/79, 72, 58; 260/174, 190

[56] References Cited

U.S. PATENT DOCUMENTS

| | | | |
|---|---|---|---|
| 3,775,105 | 11/1973 | Kukla | 430/80 |
| 3,837,851 | 9/1974 | Shattock et al. | 430/59 |
| 3,871,882 | 3/1975 | Wiedemann | 430/59 |
| 3,977,870 | 8/1976 | Rochlitz | 430/59 |
| 4,018,607 | 4/1977 | Contois | 430/73 |
| 4,026,704 | 5/1977 | Rochlitz | 430/57 |
| 4,052,210 | 10/1977 | Hectors | 430/72 |

Primary Examiner—Dennis E. Talbert, Jr.
Assistant Examiner—John L. Goodrow
Attorney, Agent, or Firm—Blanchard, Flynn, Thiel, Boutell & Tanis

[57] ABSTRACT

The present invention provides an electrophotographic element which comprises some disazo pigment expressed by the general formula

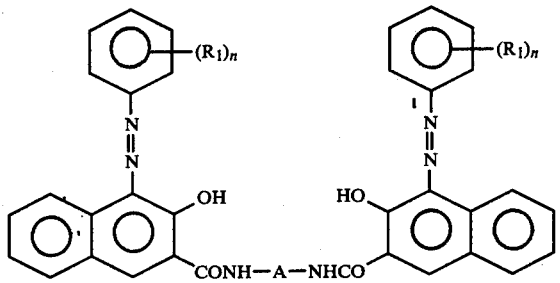

[wherein $R_1$ represents a member selected from the group consisting of hydrogen atom, methyl radical, ethyl radical, methoxy radical, ethoxy radical, chlorine atom, bromine atom, nitro radical, dimethylamino radical, diethylamino radical and phenyl radical; A represents

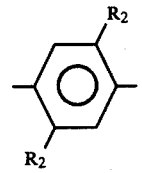

(wherein $R_2$ represents hydrogen atom or chlorine atom) or

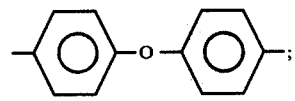

and n is an interger of 1 or 2.]

as effective component contained in the photosensitive layer thereof.

114 Claims, 3 Drawing Figures

ELECTROPHOTOGRAPHIC ELEMENT CONTAINING A DISAZO PIGMENT

BACKGROUND OF THE INVENTION (a) Field of the Invention

The present invention relates to a photosensitive element for use in electrophotography, and more particularly it relates to a novel photosensitive element having a photosensitive layer containing a disazo pigment as effective component.

(b) Description of the Prior Art

There have hitherto been developed various electrophotographic elements comprising an electroconductive support and a photosensitive layer formed thereon containing some azo pigment as effective component. For instance, Japanese Patent Publication No. 16474/1969 discloses an electrophotographic element employing some monoazo pigment, and Japanese Laid-Open Unexamined Patent Application No. 37543/1972 discloses an electrophotographic element employing some disazo pigment. These azo pigments employed in the prior art are admittedly useful materials to serve as effective component of photosensitive elements, but when various requirements for photosensitive elements from the view point of electrophotographic process are taken into consideration, there has, in fact, not been developed any photosensitive element that will meet these requirements satisfactorily. Therefore, it is important to provide a rich variety of pigments useful as effective component, without limiting to azo pigments, so as to permit a wide range of selection according to the intended electrophotographic process. By so doing, it becomes possible to provide a photosensitive element apposite to a specific process. In other words, for the electrophotographic processes, it is desirable that the variety of pigments to serve as effective component of the photosensitive elements should be as rich as possible.

SUMMARY OF THE INVENTION

The first object of the present invention is to provide an electrophotographic element containing a novel disazo pigment which can serve as effective component in performing various electrophotographic processes.

The second object of the present invention is to provide an electrophotographic element which permits a wide range of selection of disazo pigment servable as effective component thereof.

The third object of the present invention is to provide a novel electrophotographic element with high sensitivity as well as high flexibility which contains such a disazo pigment as described above.

We have prepared a group of disazo pigments and conducted a series of studies on their application to photosensitive elements. As a result, we found that disazo pigments expressed by the following general formula are servable as excellent effective component of photosensitive elements and have accomplished the present invention on the basis of this finding.

An electrophotographic element according to the present invention is characterized in that a photosensitive layer containing a disazo pigment expressed by the general formula

[wherein $R_1$ represents a member selected from the group consisting of hydrogen atom, methyl radical, ethyl radical, methoxy radical, ethoxy radical, chlorine atom, bromine atom, nitro radical, dimethylamino radical, diethylamino radical and phenyl radical; A represents wherein $R_2$ represents hydrogen atom or chlorine atom) or

;

and n is an integer of 1 or 2. ] is formed on an electroconductive support.

Concrete examples of the compounds expressed by the foregoing general formula that are useful for the present invention will be shown in the following in terms of structural formula.

(1)

(2)

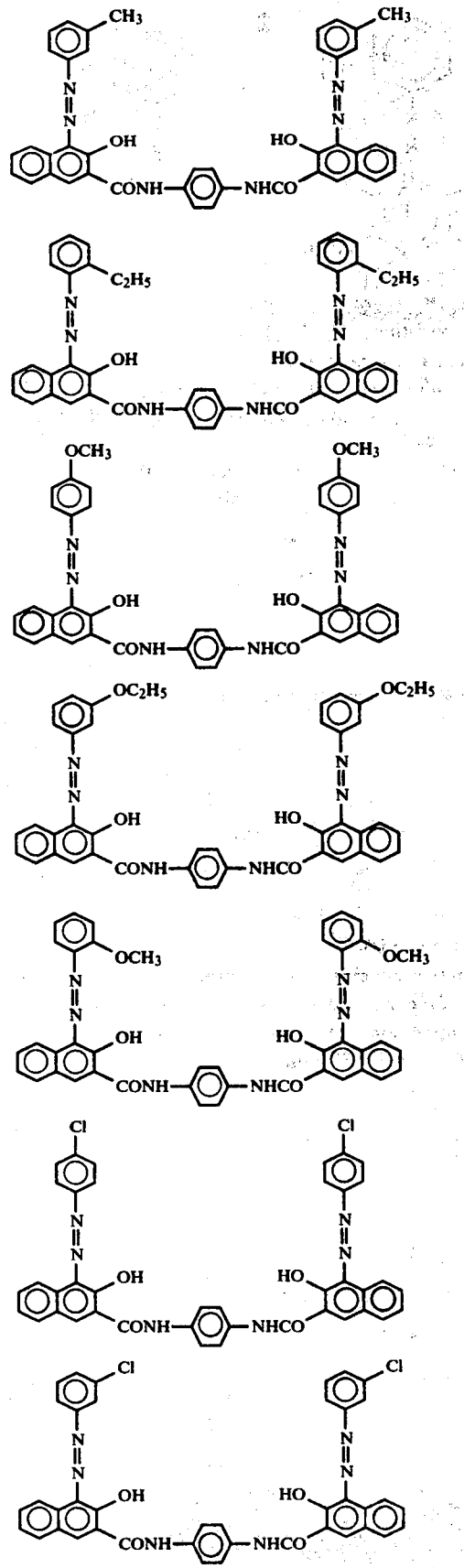
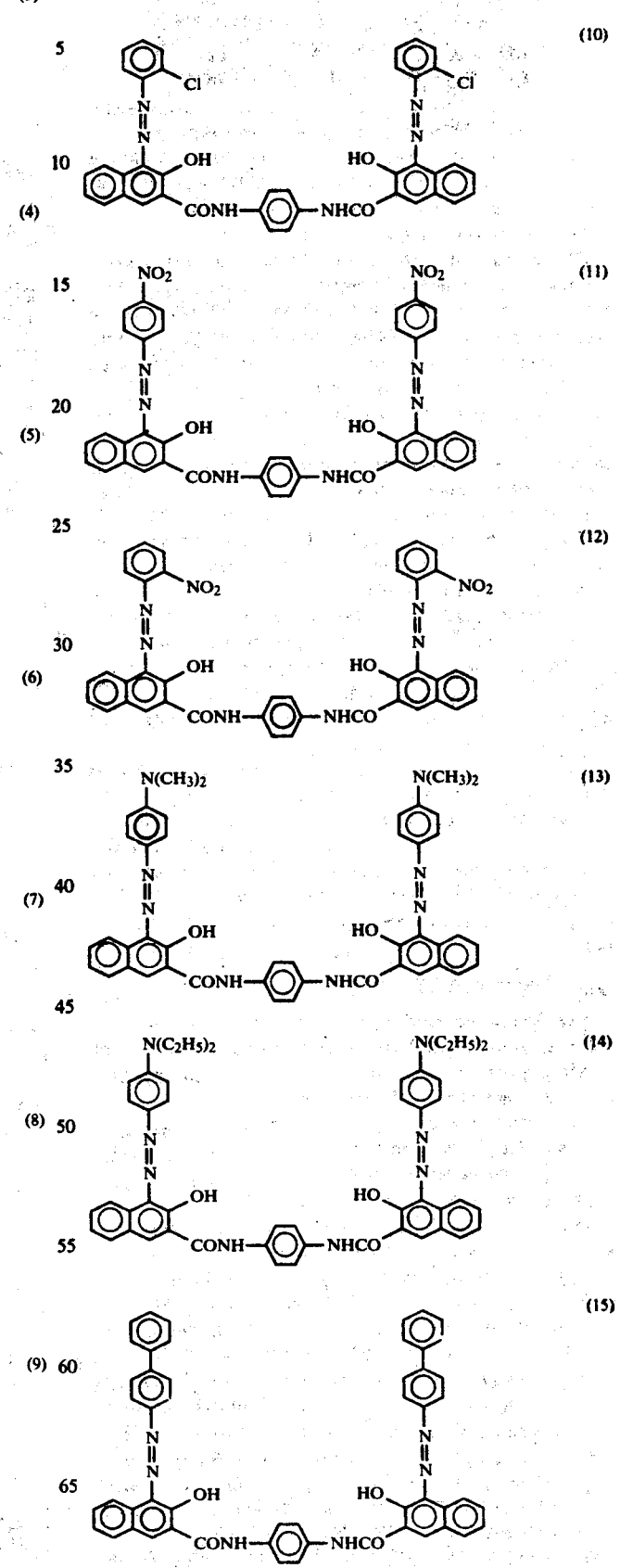

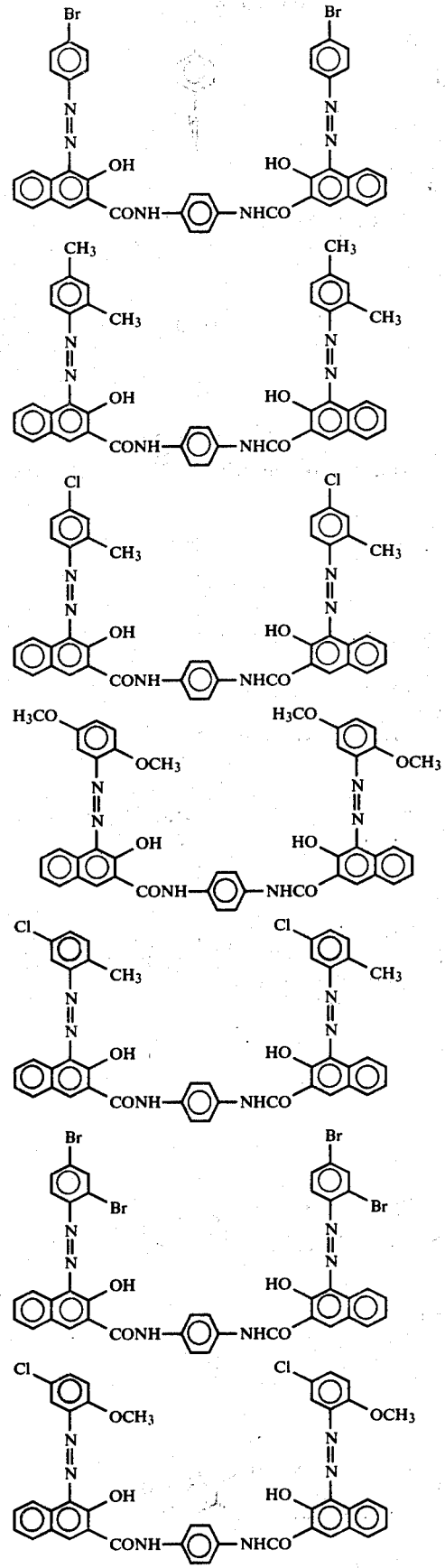
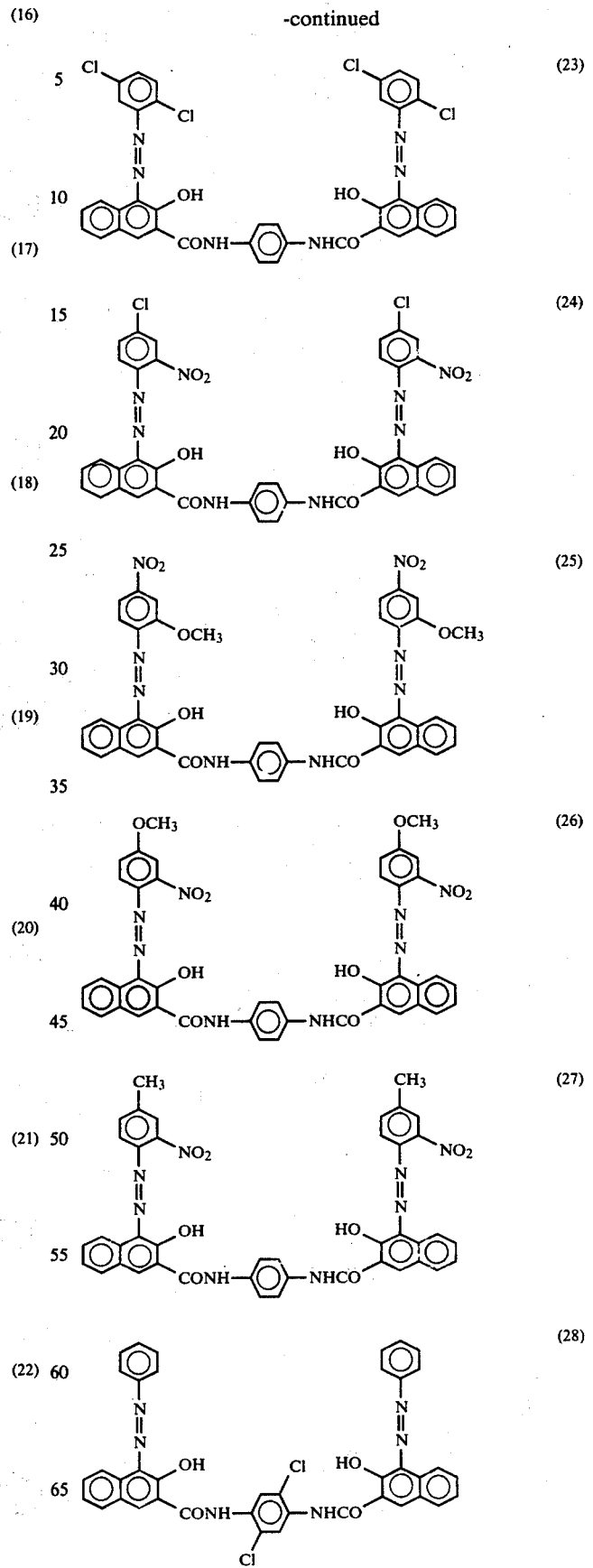

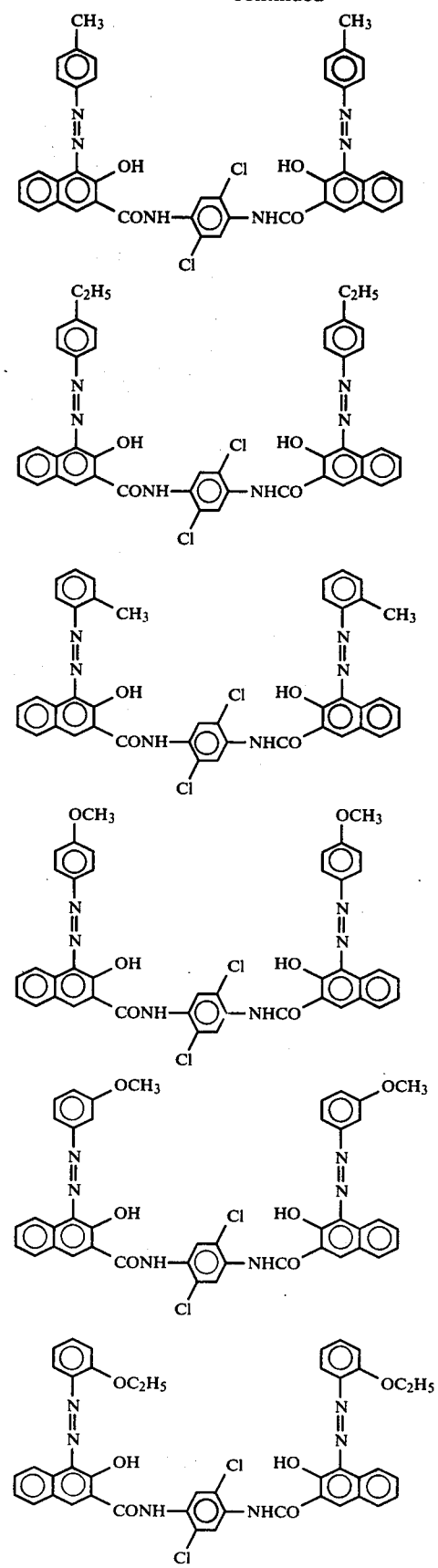
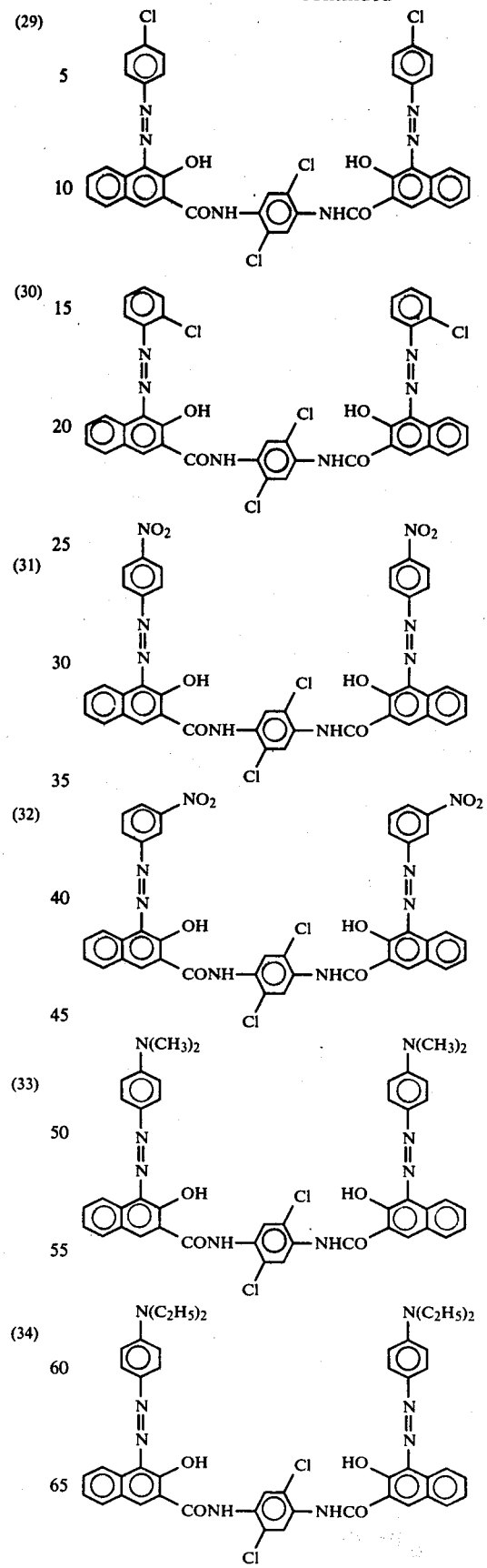

-continued
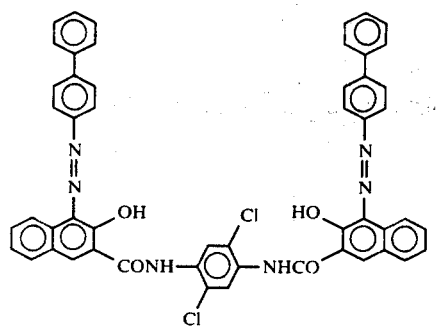 (41)
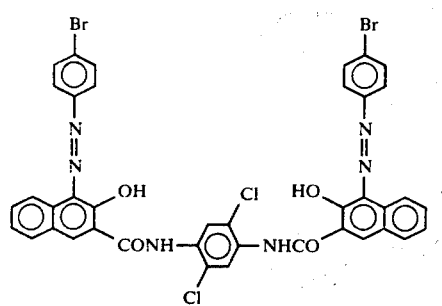 (42)
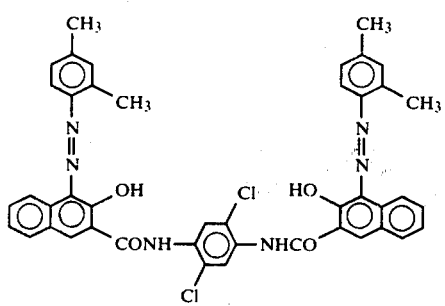 (43)
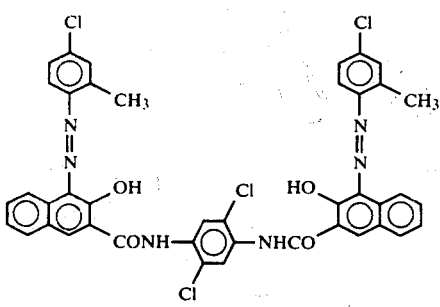 (44)
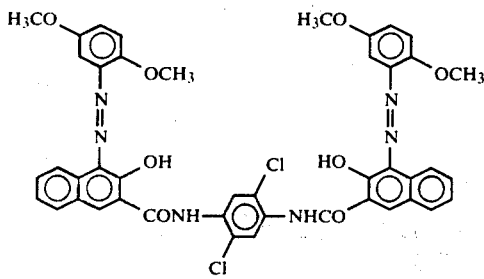 (45)
-continued
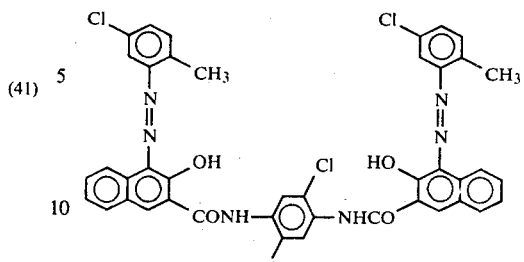 (46)
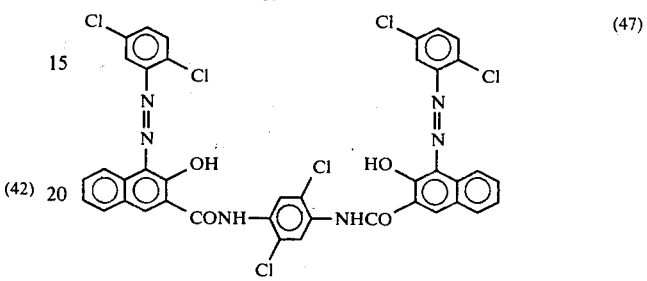 (47)
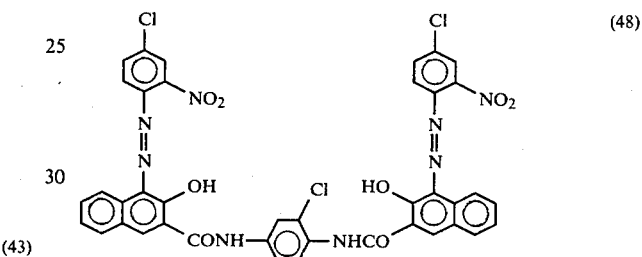 (48)
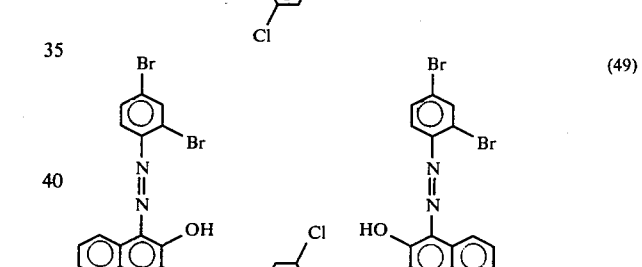 (49)
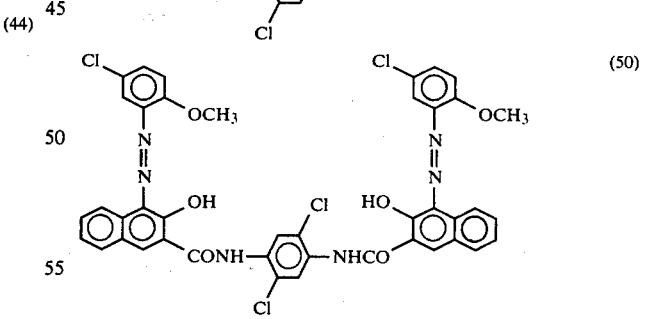 (50)
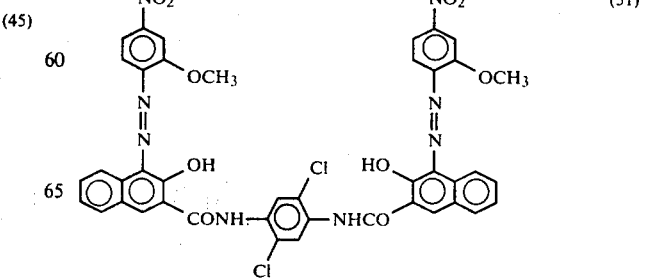 (51)

-continued
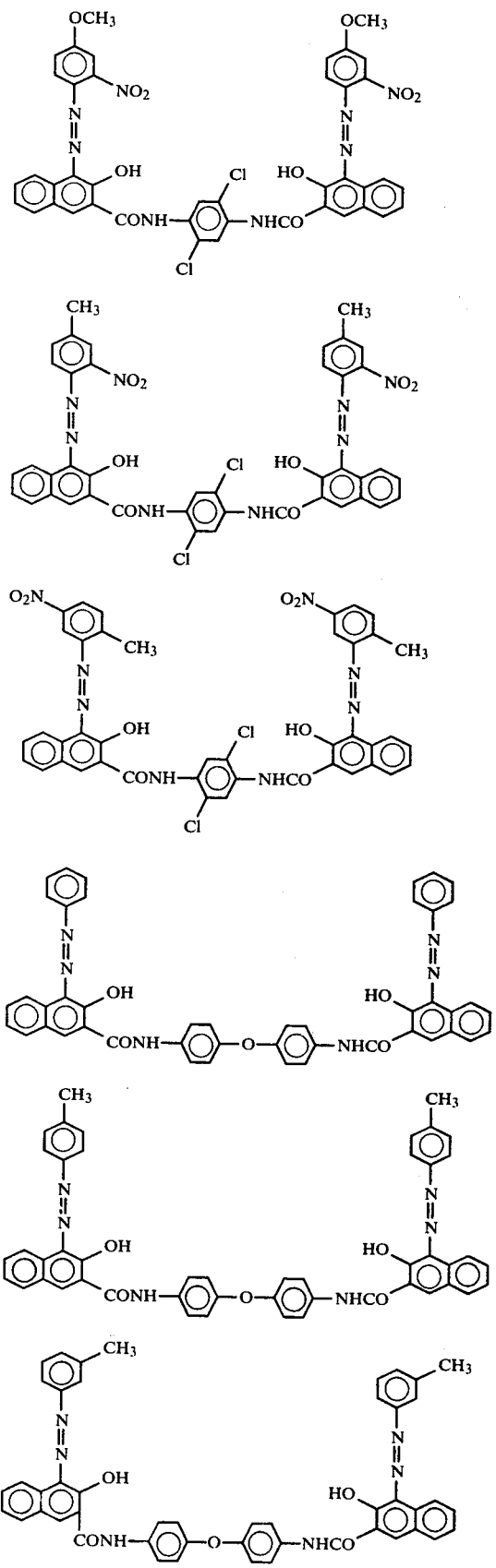
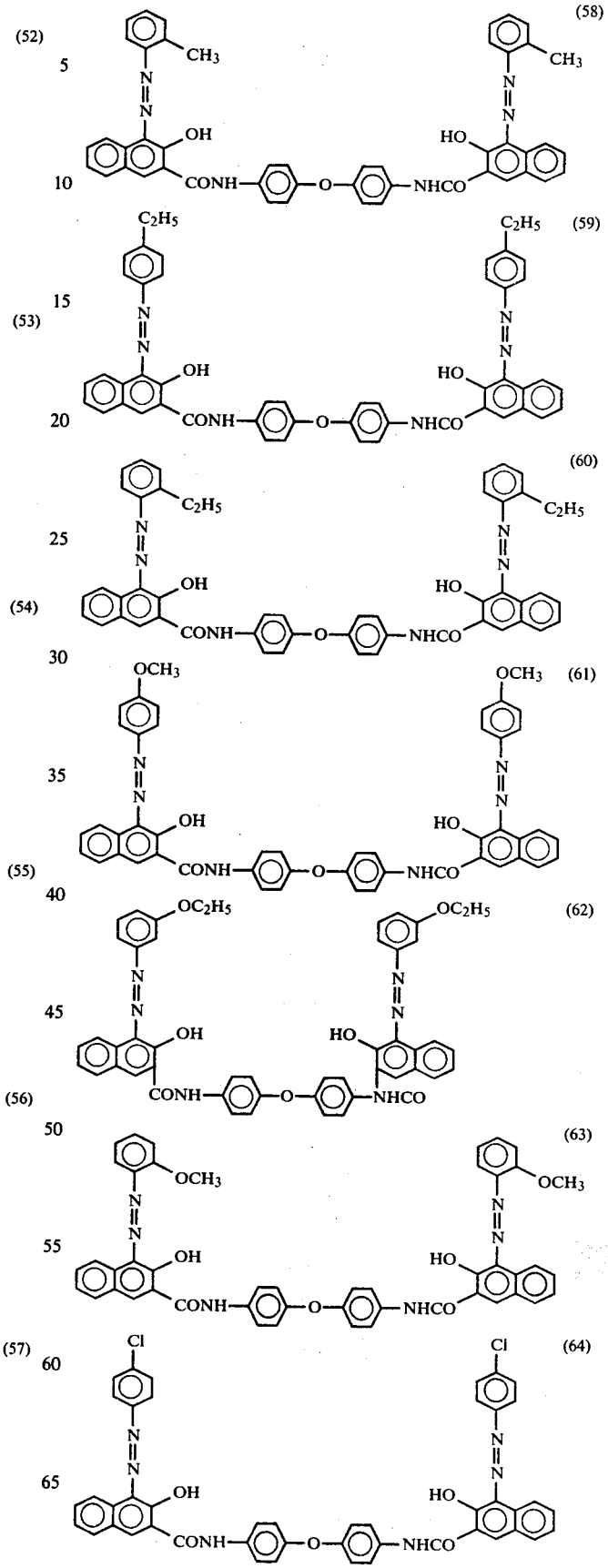

-continued
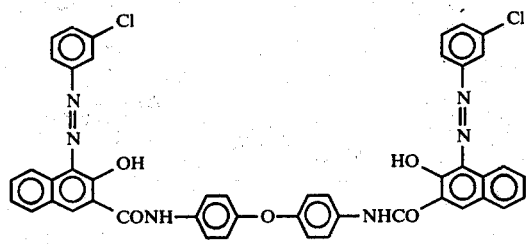 (65)
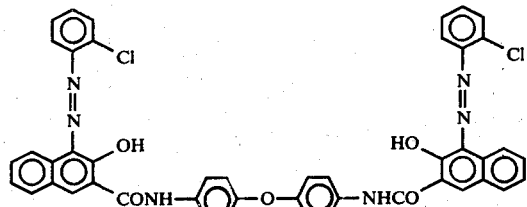 (66)
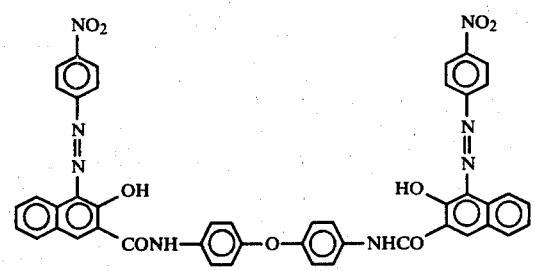 (67)
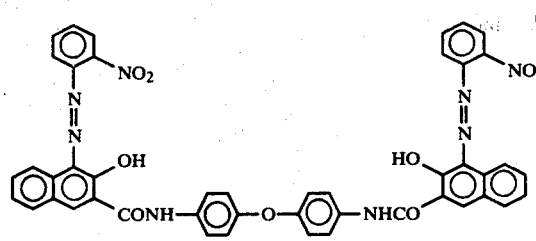 (68)
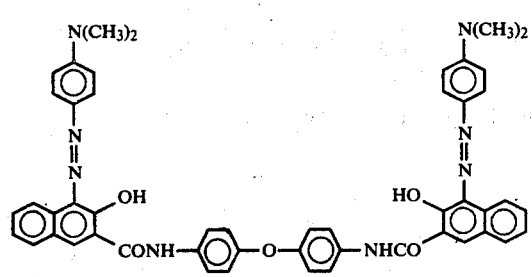 (69)
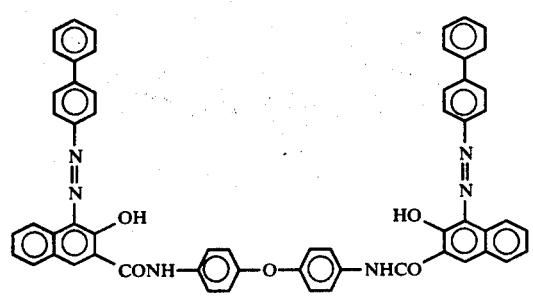 (70)
-continued
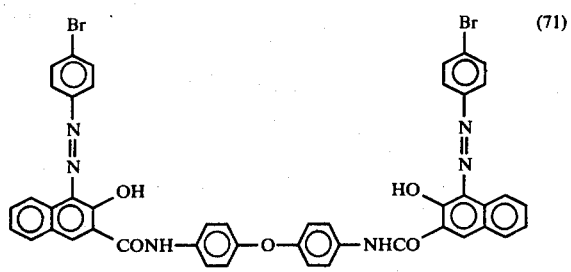 (71)
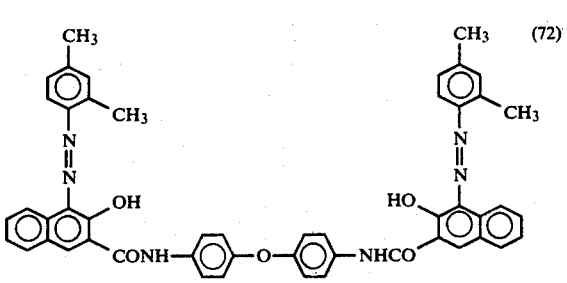 (72)
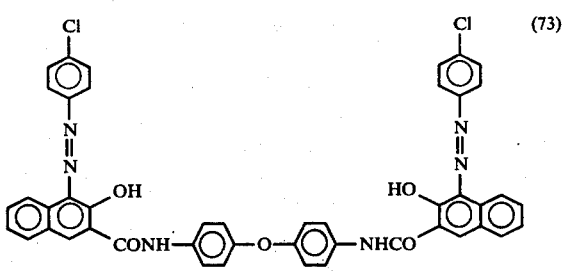 (73)
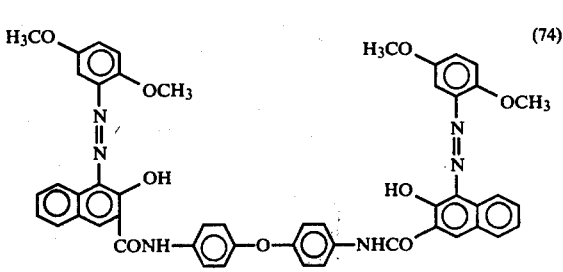 (74)
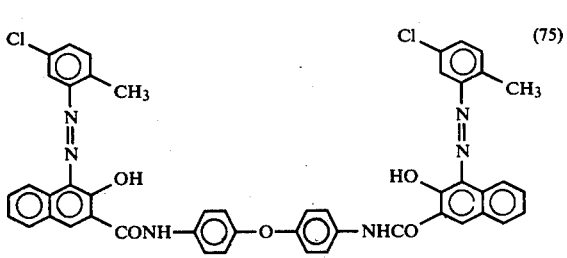 (75)
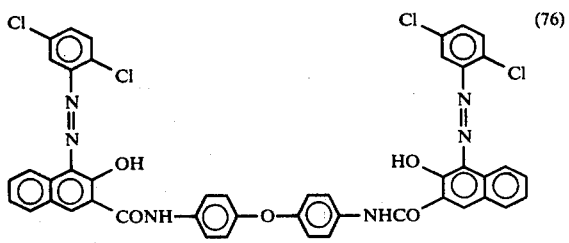 (76)

-continued
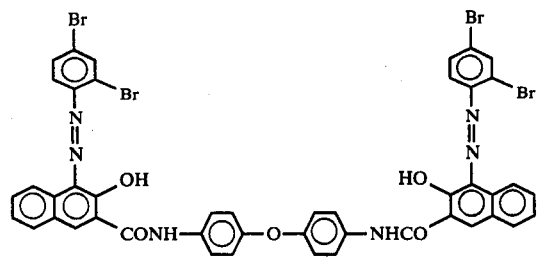 (77)
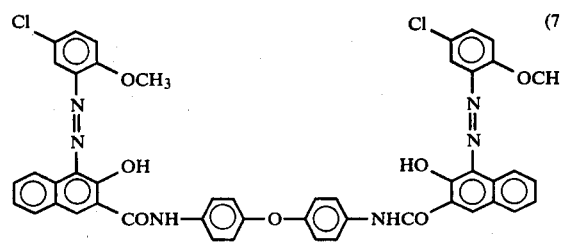 (78)
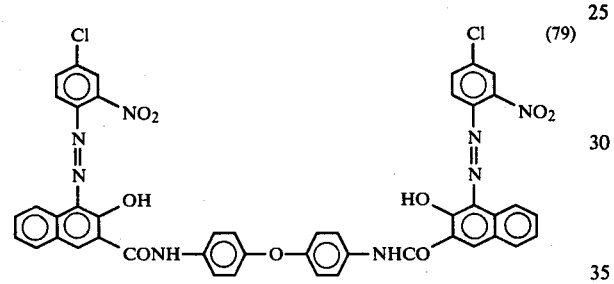 (79)
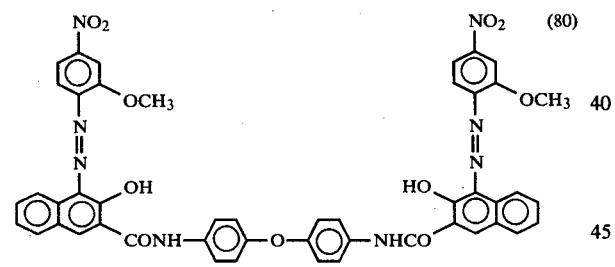 (80)
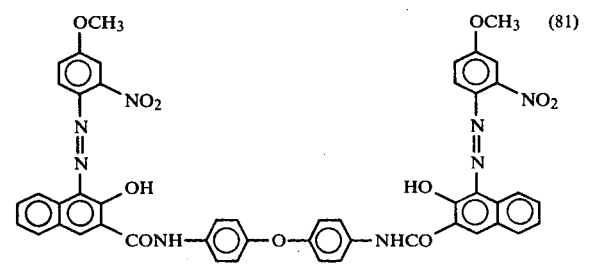 (81)
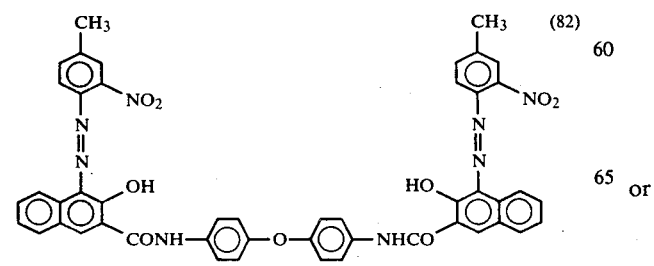 (82)
-continued
 (83)
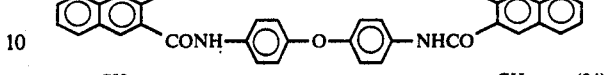 (84)
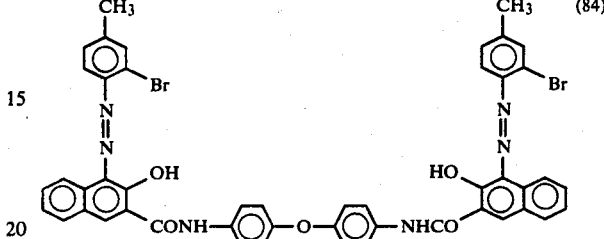
These disazo pigments can be easily prepared by effecting, for instance, condensation reaction between 2 moles of
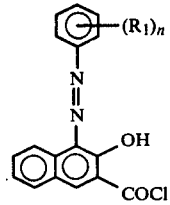
and 1 mole of
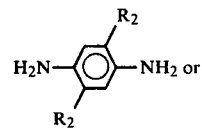
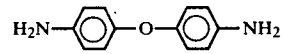
or coupling reaction between 2 moles of
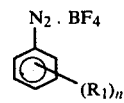
and 1 mole of
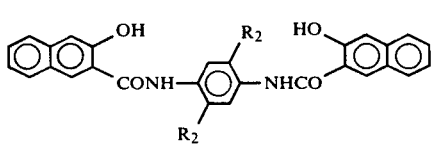
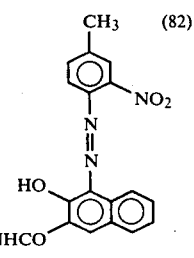
or

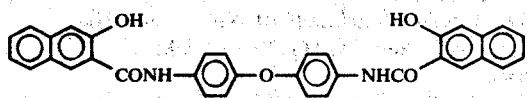

Details of these processes are disclosed in, for instance, Japanese Laid-Open Unexamined Patent Application No. 3924/1974 or U.S. Pat. No. 4,051,121.

The photosensitive elements according to the present invention contain such disazo pigments as exemplified above, and they can take various forms illustrated in FIGS. 1 through 3 of the appended drawings depending on the mode of application of these pigments. A photosensitive element illustrated in FIG. 1 is one prepared by forming a photosensitive layer 2 of disazo pigment 4 (serving herein as photoconductive substance)~binder resin 3 type on an electroconductive support 1. A photosensitive element illustrated in FIG. 2 is one prepared by forming a photosensitive layer 2' of disazo pigment 4 (serving herein as charge-carrier generating substance)~charge-transfer medium (i.e., a mixture of charge-transfer substance and binder resin) 5 type on an electroconductive support 1. A photosensitive element illustrated in FIG. 3 is a modification of the photosensitive element of FIG. 2, and the photosensitive layer 2" thereof is composed of a charge-carrier generating layer 6 consisting essentially of disazo pigment 4 and a charge-transfer medium layer 7.

In the case of the photosensitive element of FIG. 1, the disazo pigment acts as photoconductive substance, and generation and transfer of the charge-carrier necessary for light decay are effected through the medium of pigment particles. In the case of the photosensitive element of FIG. 2, the charge-transfer substance forms a charge-transfer medium together with the binder (and some plasticizer as occasion calls), while the disazo pigment acts as charge-carrier generating substance. This charge-transfer medium is not capable of generating charge-carrier like disazo pigments, but is capable of accepting and transferring charge-carrier generated from disazo pigments. That is, in the case of the photosensitive element of FIG. 2, generation of the charge-carrier necessary for light decay is performed by the disazo pigment, while transfer of the charge-carrier is performed mainly by the charge-transfer medium. A fundamental condition that is additionally required of the charge-transfer medium herein is that the absorption wave-length range of the charge-transfer medium should not overlap mainly the absorption wavelength range of the visible region of the disazo pigment. The reason is that, in order to cause the disazo pigment to generate charge-carrier efficiently, it is necessary to permeate light to the surface of pigment. The foregoing condition, however, does not apply to, for instance, a photosensitive element which is sensitive to a specific wave-length alone. Therefore, the absorption wave-length of the charge-transfer medium and that of the disazo pigment may partially overlap but should not completely overlap each other. Next, in the case of the photosensitive element of FIG. 3, light penetrated the charge-transfer medium layer 7 reaches to the charge-carrier generating layer 6 to cause the disazo pigment of that portion to generate charge-carrier, while the charge-transfer medium layer accepts the pouring of charge-carrier and performs transfer thereof, and the mechanism of effecting transfer of the charge-carrier by means of the charge-transfer medium is the same as in the case of the photosensitive element illustrated in FIG. 2. The disazo pigment herein is also a charge-carrier generating substance.

In order to prepare the photosensitive element of FIG. 1, it will do to coat a dispersion obtained by dispersing fine particles of a disazo pigment in a solution of binder on an electroconductive support and dry thereafter. In order to prepare the photosensitive element of FIG. 2, it will do to disperse fine particles of a disazo pigment in a solution obtained by dissolving a charge-transfer substance and a binder, coat the resulting dispersion on an electroconductive support and dry thereafter. The photosensitive element of FIG. 3 can be prepared either by depositing a disazo pigment on an electroconductive support by vacuum evaporation or by the process comprising dispersing fine particles of a disazo pigment in an appropriate solvent which may contain a binder dissolved therein as occasion demands, coating this dispersion on an electroconductive support and drying, subjecting the thus formed coating film to surface finishing or adjusting the thickness thereof by such means as buffing, etc. as occasion demands, and then coating a solution containing a charge-transfer substance and a binder on the film and drying thereafter. In any case, the disazo pigment for use in the present invention is employed after pulverizing into particle diameter of 5 microns or less, preferably 2 microns or less, by means of a ball mill or the like. The coating is performed by conventional means such as doctor blade, wire bar, etc. The thickness of the photosensitive layer is about 3 to 50 microns, preferably 5 to 20 microns, in the case of the photosensitive elements of FIG. 1 and FIG. 2. In the case of the photosensitive element of FIG. 3, the appropriate thickness of the charge-carrier generating layer is 0.01 to 5 microns, preferably 2 microns or less, while the appropriate thickness of the charge-transfer medium layer is about 3 to 50 microns, preferably 5 to 20 microns. Further, in the photosensitive element of FIG. 1, the appropriate amount of the disazo pigment contained in the photosensitive layer is 30 to 70% by weight, preferably about 50% by weight, relative to the photosensitive layer. (As stated above, in the case of the photosensitive element of FIG. 1, the disazo pigment acts as photoconductive substance and generation and transfer of the charge-carrier necessary for light decay are performed by means of pigment particles. Therefore, it is desirable that contact between pigment particles be continuous from the surface of the photosensitive layer to the support. Accordingly, it is desirable that the content of the pigment in the photosensitive layer be relatively large. However, when the strength and sensitivity of the photosensitive layer are taken into consideration, the appropriate content is about 50% by weight). In the photosensitive element of FIG. 2, the content of the disazo pigment in the photosensitive layer accounts for 1 to 50% by weight, preferably 20% by weight or less, while the content of the charge-transfer substance therein accounts for 10 to 95% by weight, preferably 30 to 90% by weight. The content of the charge-transfer substance in the charge-transfer medium layer in the case of the photosensitive element of FIG. 3 accounts for 10 to 95% by weight, preferably 30 to 90% by weight, like in the case of the photosensitive layer of the photosensitive element of FIG. 2. Further, in preparing any of the photosensitive elements shown in FIGS. 1 through 3, some plasticizer can be employed jointly with the binder.

As the electroconductive support for the photosensitive elements of the present invention, a plate or a foil of a metal such as aluminum, a plastic film deposited with a metal such as aluminum by vacuum evaporation, a paper processed for conductivity, etc. are useful. As the binder for the present invention, condensation resins such as polyamide, polyurethane, polyester, epoxide resin, polyketone, polycarbonate, etc. and vinyl polymers such as polyvinyl ketone, polystyrene, poly-N-vinyl carbazole, polyacrylamide, etc. can be cited, but any other resin will do as long as the insulating property and the adhesive property thereof are sufficient. As the plasticizer applicable to the present invention, halogenated paraffin, polybiphenyl chloride, dimethyl naphthalene, dibutyl phthalate, etc. can be cited. To cite charge-transfer substances suitable for the present invention, as high-molecular substance, there are vinyl polymers such as poly-N-vinyl carbazole, halogenated poly-N-vinyl carbazole, polyvinyl pyrene, polyvinyl indoloquinoxaline, polyvinyl dibenzothiophene, polyvinyl anthracene, polyvinyl acridine, etc. and condensation resins such as pyrene~formaldehyde resin, bromopyrene~formaldehyde resin, ethyl carbozole~-formaldehyde resin, chloroethyl carbazole~formaldehyde resin, etc., and as low-molecular substance (monomer), there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitro-dibenzothiophene, 2,8-dinitrodibenzothiophene, 3-nitrodibenzothiophene-5-oxide, 3,7-dinitrodibenzothiophene-5-oxide, 1,3,7-trinitrobenzothiophene-5,5-dioxide, 3-nitrodibenzothiophene-5,5-dioxide, 3,7-dinitrodibenzothiophene-5,5-dioxide, 4-dicyanomethylene-4H-indeno[1,2-b]thiophene, 6,8-dinitro-4H-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenonthrenequinone, 1,4-naphthoquinone benzo[a]anthracene-7,12-dione, 2,4,7-trinitro-9-dicyanomethylene-fluorene, tetrachlorophthalic anhydride, 1-bromopyrene, 1-methyl pyrene, 1-ethyl pyrene, 1-acetyl pyrene, carbazole, N-ethyl carbazole, N-β-chloroethyl carbazole, N-β-hydroxyethyl carbazole, 2-phenyl indole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyl oxazole, triphenyl amine, tris(4-diethylaminophenyl)-methane, 3,6-bis(dibenzylamino)-9-ethyl carbazole, etc. These charge-transfer substances are employed either independently or in the form of a mixture of two or more of them.

All the photosensitive elements prepared as above can be further provided with an adhesive layer or a barrier layer, as occasion demands, which is interposed between the electroconductive support and the photosensitive layer. As the material to form this layer, polyamide, nitrocellulose, aluminum oxide, etc. are appropriate, and the thickness of the layer is preferably 1 micron or less.

In order to perform copying by employing a photosensitive element of the present invention, it suffices to charge the element by its photosensitive layer side, expose to light, develop thereafter, and transfer the developed image to a paper or the like as occasion demands.

Photosensitive elements according to the present invention have excellent advantages such that they are generally high in sensitivity and rich in flexibility.

DESCRIPTION OF THE PREFERRED EMBODIMENTS

Example 1

1 part by weight of polyester resin (namely, Polyester Adhesive 49000, the manufacture of Du Pont Inc.), 1 part by weight of disazo pigment No. 1 and 26 parts by weight of tetrahydrofuran were crushed and mixed within a ball mill, and the resulting dispersion was coated, by means of a doctor blade, on a polyester film deposited with aluminum by vacuum evaporation and was dried at 100° C. for 10 minutes, whereby there was obtained a photosensitive element having a 7-micron thick photosensitive layer and assuming the form illustrated in FIG. 1.

Next, the photosensitive layer side of this photosensitive element was positively charged by means of corona discharge of +6 KV for 20 seconds in a commercial testing apparatus for electrostatic copying paper, and then the surface potential Vpo(volt) thereof was measured after standing it for 20 seconds in the dark. Subsequently, the photosensitive layer of this element was exposed to the light of a tungsten lamp so as to attain the surface illumination of 20 luxes, and the amount of exposure $E_{\frac{1}{2}}$ (in terms of lux·sec.) was determined from the time of exposure (in terms of second) required for decrease of the surface potential Vpo to half. The results were as follows:

Vpo: 940 V, $E_{\frac{1}{2}}$: 68.3 lux·sec.

Examples 2 through 20

A variety of photosensitive elements were prepared by applying the same procedure as that in Example 1 except for replacing disazo pigment No. 1 employed therein with the disazo pigments having their serial numbers as shown in the following Table-1 respectively. When the same measurement as in Example 1 was conducted on each of these photosensitive elements, the results were as shown in Table-1 respectively.

Table-1

| Example No. | Disazo pigment No. | Vpo (volt) | $E_{\frac{1}{2}}$ (lux . sec.) |
|---|---|---|---|
| 2 | 8 | 800 | 78.9 |
| 3 | 11 | 1260 | 62.1 |
| 4 | 19 | 730 | 40.3 |
| 5 | 26 | 690 | 31.9 |
| 6 | 33 | 1030 | 49.8 |
| 7 | 39 | 1100 | 72.1 |
| 8 | 45 | 760 | 50.3 |
| 9 | 50 | 830 | 30.9 |
| 10 | 53 | 980 | 43.7 |
| 11 | 55 | 860 | 47.8 |
| 12 | 58 | 620 | 9.3 |
| 13 | 61 | 850 | 25.1 |
| 14 | 62 | 530 | 57.5 |
| 15 | 65 | 720 | 33.6 |
| 16 | 69 | 760 | 43.3 |
| 17 | 73 | 1010 | 34.1 |
| 18 | 77 | 470 | 18.6 |
| 19 | 83 | 730 | 15.7 |

Table-1-continued

| Example No. | Disazo pigment No. | Vpo (volt) | E½ (lux . sec.) |
| --- | --- | --- | --- |
| 20 | 84 | 1010 | 71.3 |

Example 21

10 parts by weight of polyester resin (the same substance as that in Example 1), 10 parts by weight of 2,4,7-trinitro-9-fluorenone, 2 parts by weight of disazo pigment No. 2 and 198 parts by weight of tetrahydrofuran were crushed and mixed within a ball mill, and the resulting dispersion was coated, by means of a doctor blade, on a polyester film deposited with aluminum through vacuum evaporation and was dried at 100° C. for 10 minutes, whereby there was obtained a photosensitive element having a 10-micron thick photosensitive layer and assuming the form illustrated in FIG. 2. Next, this photosensitive element was subjected to the same measurement as in Example 1 to determine the values of Vpo and E½ except for applying corona discharge of −6 KV instead of +6 KV. The results were as follows:
Vpo: 680 V, E½: 20.4 lux·sec.

Examples 22 through 40

A variety of photosensitive elements assuming the form illustrated in FIG. 2 were prepared by applying the same procedure as that in Example 21 except for replacing disazo pigment No. 2 employed therein with the disazo pigments having their serial numbers as shown in the following Table-2 respectively. When the values of Vpo and E½ of each element were determined in the same way as in Example 21, the results were as shown in Table-2.

Table-2

| Example No. | Disazo pigment No. | Vpo (volt) | E½ (lux . sec.) |
| --- | --- | --- | --- |
| 22 | 10 | 810 | 43.8 |
| 23 | 15 | 690 | 24.5 |
| 24 | 24 | 840 | 42.5 |
| 25 | 29 | 470 | 75.9 |
| 26 | 38 | 740 | 10.3 |
| 27 | 47 | 540 | 39.7 |
| 28 | 49 | 760 | 43.9 |
| 29 | 51 | 660 | 38.1 |
| 30 | 54 | 580 | 48.9 |
| 31 | 56 | 1020 | 16.3 |
| 32 | 55 | 740 | 37.7 |
| 33 | 62 | 670 | 55.6 |
| 34 | 63 | 690 | 25.0 |
| 35 | 66 | 850 | 34.3 |
| 36 | 68 | 1080 | 45.2 |
| 37 | 71 | 700 | 18.5 |
| 38 | 74 | 1300 | 24.7 |
| 39 | 78 | 830 | 11.1 |
| 40 | 82 | 940 | 37.0 |

Example 41

10 parts by weight of polyester resin (the same substance as that in Example 1), 10 parts by weight of 2,5-bis(4-diethylaminophenyl)-1,3,4-oxadiazole, 2 parts by weight of disazo pigment No. 3 and 198 parts by weight of tetrahydrofuran were crushed and mixed within a ball mill, and the resulting dispersion was coated, by means of a doctor blade, on a polyester film deposited with aluminum through vacuum evaporation and was dried at 120° C. for 10 minutes, whereby there was obtained a photosensitive element having a 12-micron thick photosensitive layer and assuming the form illustrated in FIG. 2. Next, this photosensitive element was subjected to the same measurement as in Example 1 to determine the values of Vpo and E½. The results were as follows:
Vpo: 950 V, E½: 17.8 lux·sec.

Examples 42 through 60

A variety of photosensitive elements assuming the form illustrated in FIG. 2 were prepared by applying the same procedure as that in Example 21 except for replacing disazo pigment No. 3 employed therein with the disazo pigments having their serial numbers as shown in the following Table-3 respectively. When the values of Vpo and E½ of each element were determined in the same way as in Example 1, the results were as shown in Table-3.

Table-3

| Example No. | Disazo pigment No. | Vpo (volt) | E½ (lux . sec.) |
| --- | --- | --- | --- |
| 42 | 7 | 980 | 54.5 |
| 43 | 14 | 940 | 36.1 |
| 44 | 23 | 740 | 27.1 |
| 45 | 27 | 1050 | 48.5 |
| 46 | 32 | 910 | 34.5 |
| 47 | 36 | 1040 | 17.2 |
| 48 | 40 | 820 | 20.3 |
| 49 | 43 | 630 | 53.1 |
| 50 | 50 | 740 | 15.1 |
| 51 | 57 | 940 | 16.5 |
| 52 | 59 | 620 | 21.5 |
| 53 | 60 | 950 | 29.5 |
| 54 | 64 | 1060 | 17.3 |
| 55 | 67 | 810 | 52.5 |
| 56 | 70 | 970 | 70.5 |
| 57 | 72 | 650 | 24.5 |
| 58 | 75 | 780 | 8.5 |
| 59 | 76 | 720 | 56.5 |
| 60 | 81 | 880 | 34.7 |

Example 61

2 parts by weight of disazo pigment No. 5 and 98 parts by weight of tetrahydrofuran were crushed and mixed within a ball mill, and the resulting dispersion was coated, by means of a doctor blade, on a polyester film deposited with aluminum through vacuum evaporation and was subjected to natural drying, whereby there was formed a 1-micron thick charge-carrier generating layer. On the other hand, 2 parts by weight of 2,4,7-trinitro-9-fluorenon, 2 parts by weight of polycarbonate (namely, Panlite L, the manufacture of TEIJIN Inc.) and 46 parts by weight of tetrahydrofuran were mixed to prepare a dispersion. Then, this dispersion was coated on the foregoing charge-carrier generating layer by means of a doctor blade and was dried at 100° C. for 10 minutes to form a 10-micron thick charge-transfer medium layer, whereby there was obtained a photosensitive element assuming the form illustrated in FIG. 3. When the values of Vpo and E½ of the thus obtained element were determined in the same way as in Example 1, the results were as follows:
Vpo: 1020 V, E½: 58.3 lux·sec.

Examples 62 through 80

A variety of photosensitive elements assuming the form illustrated in FIG. 3 were prepared by applying the same procedure as that in Example 61 except for replacing disazo pigment No. 5 employed therein with the disazo pigments having their serial numbers as shown in the following Table-4 respectively. The values of Vpo and E½ of these photosensitive elements were as shown in Table-4.

Table-4

| Example No. | Disazo pigment No. | Vpo (volt) | E½ (lux . sec.) |
|---|---|---|---|
| 62 | 9 | 890 | 48.9 |
| 63 | 12 | 1020 | 17.0 |
| 64 | 17 | 1050 | 21.6 |
| 65 | 20 | 1300 | 40.3 |
| 66 | 25 | 650 | 29.1 |
| 67 | 30 | 740 | 48.4 |
| 68 | 35 | 940 | 64.7 |
| 69 | 41 | 850 | 37.8 |
| 70 | 52 | 1130 | 27.9 |
| 71 | 59 | 1090 | 23.1 |
| 72 | 57 | 740 | 45.9 |
| 73 | 60 | 1070 | 10.6 |
| 74 | 65 | 960 | 34.7 |
| 75 | 69 | 770 | 9.9 |
| 76 | 73 | 950 | 33.9 |
| 77 | 75 | 1110 | 56.9 |
| 78 | 79 | 850 | 10.9 |
| 79 | 80 | 950 | 37.7 |
| 80 | 84 | 1020 | 10.4 |

Example 81

2 parts by weight of disazo pigment No. 6 and 98 parts by weight of tetrahydrofuran were crushed and mixed within a ball mill, and the resulting dispersion was coated, by means of a doctor blade, on a polyester film deposited with aluminum through vacuum evaporation and was subjected to natural drying, whereby there was formed a 1-micron thick charge-carrier generating layer. On the other hand, 2 parts by weight of 2,5-bis(4-diethylaminophenyl)-1,3,4-oxadiazole, 2 parts by weight of polycarbonate (the same substance as employed in Example 31) and 16 parts by weight of tetrahydrofuran were mixed to prepare a dispersion. Then, this dispersion was coated on the foregoing charge-carrier generating layer by means of a doctor blade and was dried at 420° C. for 10 minutes to form a 14-micron thick charge-transfer medium layer, whereby there was obtained a laminate-type photosensitive element illustrated in FIG. 3. When the thus obtained photosensitive element was subjected to the same measurement as in Example 1 to determine the values of Vpo and E½ thereof except for applying corona discharge of −6KV instead of +6KV, the results were as follows:

Vpo: 780V, E½: 26.5 lux·sec.

Examples 82 through 100

A variety of photosensitive elements similar to that of Example 81 were prepared by applying the same procedure as that in Example 81 except for replacing disazo pigment No. 6 employed therein with the disazo pigments having their serial numbers as shown in the following Table-5 respectively.

The values Vpo and E½ of these photosensitive elements were as shown in Table-5.

Table-5

| Example No. | Disazo pigment No. | Vpo (volt) | E½ (lux . sec.) |
|---|---|---|---|
| 82 | 4 | 870 | 37.7 |
| 83 | 13 | 1040 | 53.1 |
| 84 | 16 | 1350 | 30.9 |
| 85 | 18 | 720 | 16.0 |
| 86 | 21 | 740 | 12.7 |
| 87 | 28 | 890 | 36.3 |
| 88 | 31 | 640 | 37.3 |
| 89 | 37 | 930 | 13.5 |
| 90 | 44 | 1080 | 29.5 |
| 91 | 60 | 950 | 9.8 |
| 92 | 58 | 1060 | 14.9 |
| 93 | 61 | 710 | 47.8 |
| 94 | 63 | 810 | 48.9 |
| 95 | 66 | 990 | 37.7 |
| 96 | 68 | 940 | 11.7 |
| 97 | 71 | 740 | 36.9 |
| 98 | 74 | 1000 | 33.9 |
| 99 | 77 | 1030 | 12.5 |
| 100 | 82 | 970 | 16.7 |

BRIEF DESCRIPTION OF THE DRAWINGS

FIGS. 1 through 3 illustrate a diagrammatic cross-sectional view each, on an enlarged scale, of various photosensitive elements according to the present invention, in which:

Figure 1:
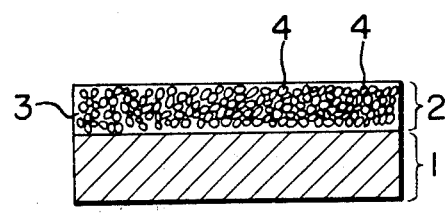
Figure 2:
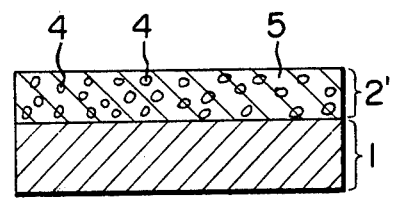
Figure 3:
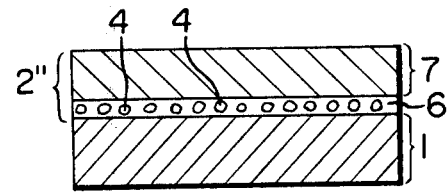

1 . . . an electroconductive support
2, 2', 2'' . . . a photosensitive layer
3 . . . a binder
4 . . . a disazo pigment
5 . . . a charge-transfer medium
6 . . . a charge-carrier generating layer
7 . . . a charge-transfer medium layer

What is claimed is:

1. A photosensitive element for use in electrophotography which comprises an electroconductive support and a photosensitive layer, formed thereon, consisting essentially of a disazo pigment expressed by the general formula

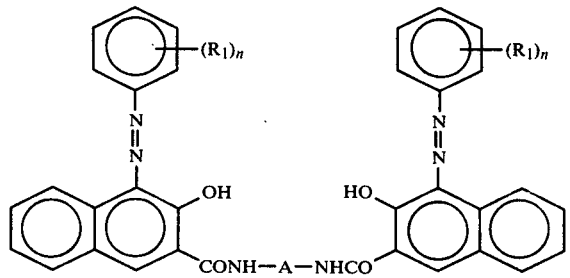

[wherein $R_1$ represents a member selected from the group consisting of hydrogen atom, methyl radical, ethyl radical, methoxy radical, ethoxy radical, chlorine atom, bromine atom, nitro radical, dimethylamino radical, diethylamino radical and phenyl radical; A represents

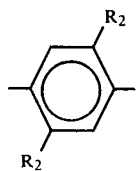

(wherein R₂ represents hydrogen atom or chlorine atom) or

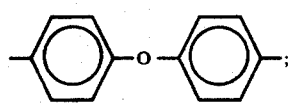

and n is an integer of 1 or 2] and a resin binder.

2. A photosensitive element according to claim 1 wherein the thickness of said photosensitive layer is in the range of from about 3μ to about 50μ.

3. A photosensitive element according to claim 1 wherein the amount of said disazo pigment is in the range of from 30 wt. % to 70 wt. % relative to the photosensitive layer.

4. A photosensitive element according to claim 1 wherein A represents

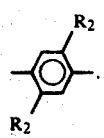

5. A photosensitive element according to claim 1 wherein A represents

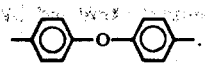

6. A photosensitive element according to claim 1 wherein the compound expressed by the general formula is

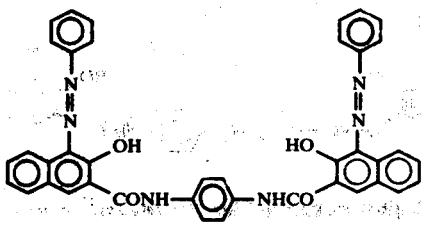

7. A photosensitive element according to claim 1 wherein the compound expressed by the general formula is

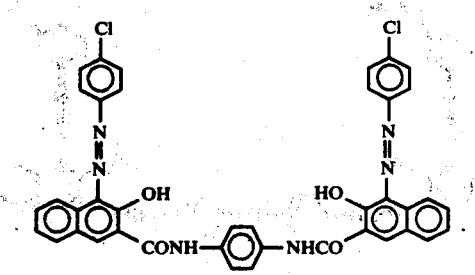

8. A photosensitive element according to claim 1 wherein the compound expressed by the general formula is

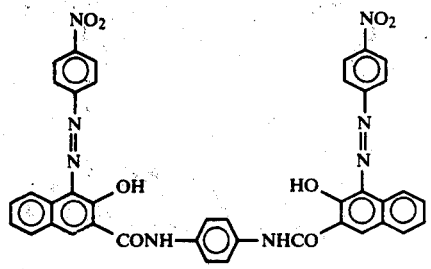

9. A photosensitive element according to claim 1 wherein the compound expressed by the general formula is

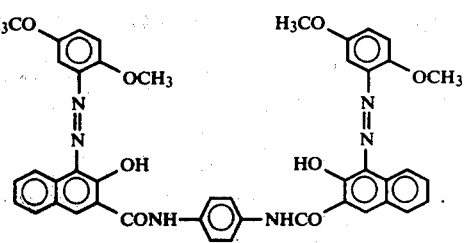

10. A photosensitive element according to claim 1 wherein the compound expressed by the general formula is

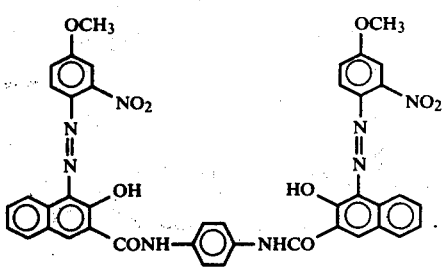

11. A photosensitive element according to claim 1 wherein the compound expressed by the general formula is

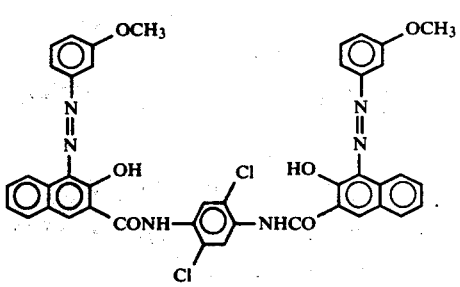

12. A photosensitive element according to claim 1 wherein the compound expressed by the general formula is 13. A photosensitive element according to claim 1 wherein the compound expressed by the general formula is

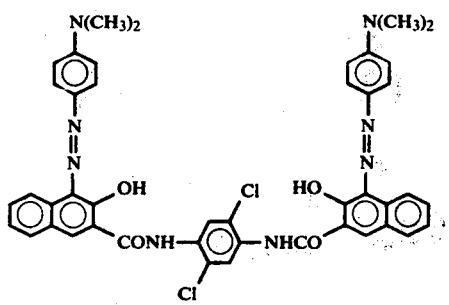

14. A photosensitive element according to claim 1 wherein the compound expressed by the general formula is

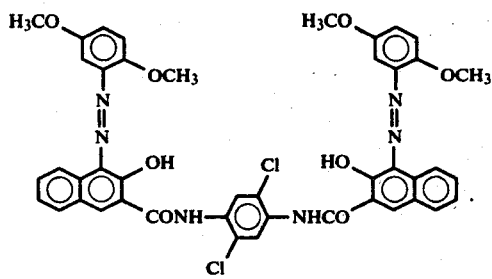

15. A photosensitive element according to claim 1 wherein the compound expressed by the general formula is

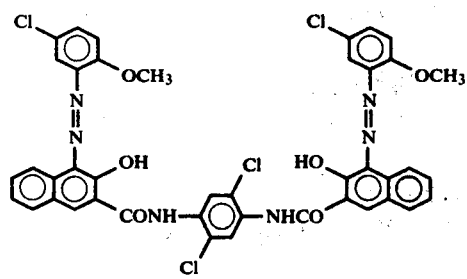

16. A photosensitive element according to claim 1 wherein the compound expressed by the general formula is

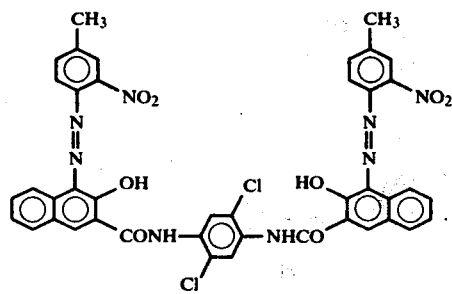

17. A photosensitive element according to claim 1 wherein the compound expressed by the general formula is

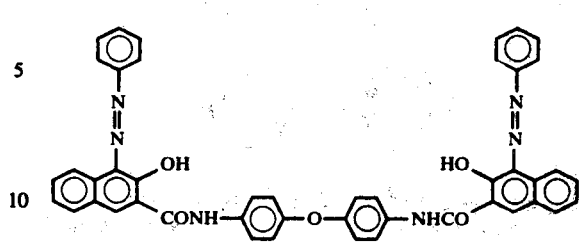

18. A photosensitive element according to claim 1 wherein the compound expressed by the general formula is

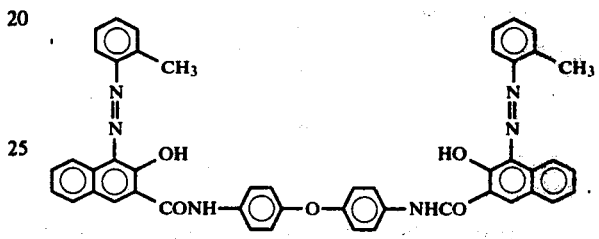

19. A photosensitive element according to claim 1 wherein the compound expressed by the general formula is

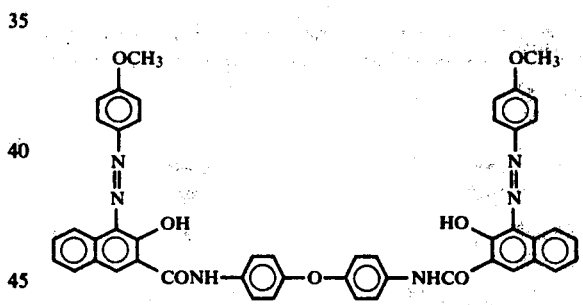

20. A photosensitive element according to claim 1 wherein the compound expressed by the general formula is

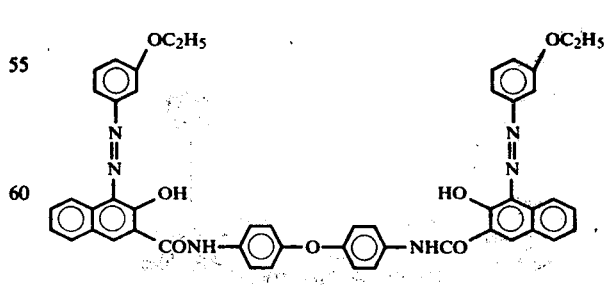

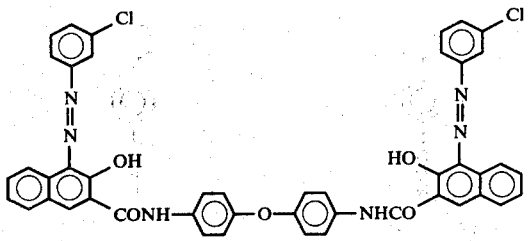

21. A photosensitive element according to claim 1 wherein the compound expressed by the general formula is

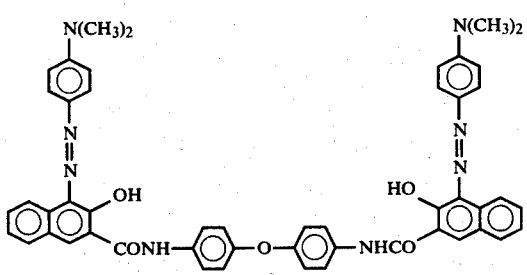

22. A photosensitive element according to claim 1 wherein the compound expressed by the general formula is

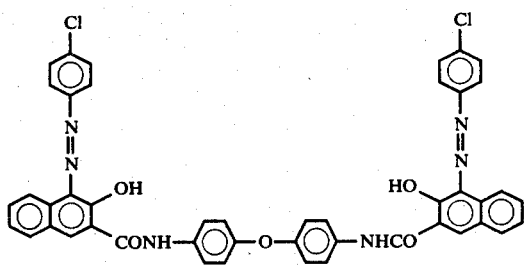

23. A photosensitive element according to claim 1 wherein the compound expressed by the general formula is

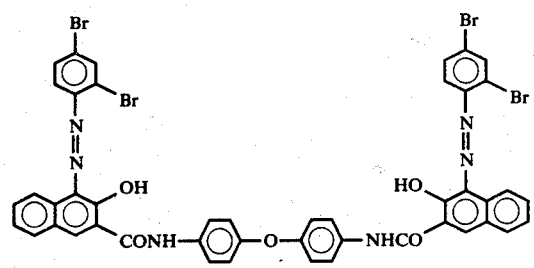

24. A photosensitive element according to claim 1 wherein the compound expressed by the general formula is

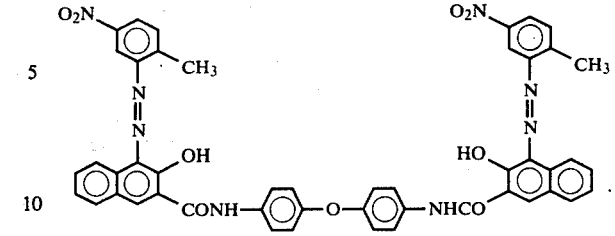

25. A photosensitive element according to claim 1 wherein the compound expressed by the general formula is

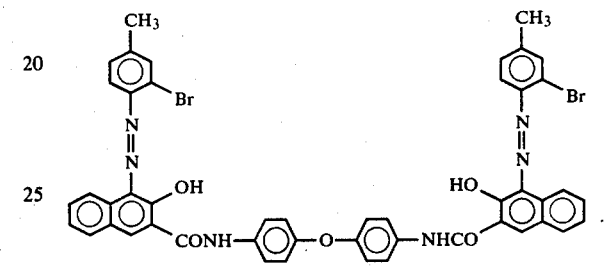

26. A photosensitive element for use in electrophotography which comprises an electroconductive support and a photosensitive layer, formed thereon, consisting essentially of a disazo pigment expressed by the general formula

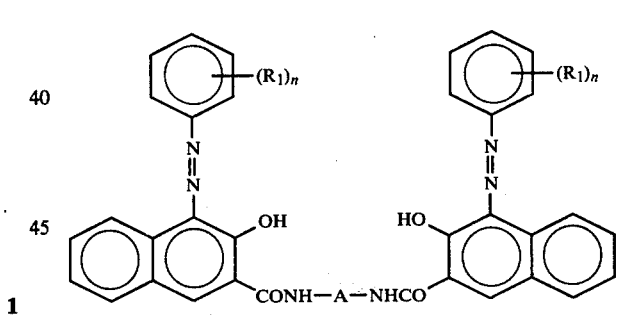

[wherein $R_1$ represents a member selected from the group consisting of hydrogen atom, methyl radical, ethyl radical, methoxy radical, ethoxy radical, chlorine atom, bromine atom, nitro radical, dimethylamino radical, diethylamino radical and phenyl radical; A represents

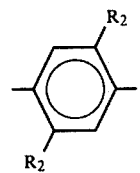

(wherein $R_2$ represents hydrogen atom or chlorine atom) or

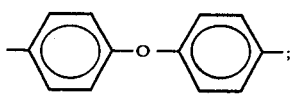

and n is an integer of 1 or 2], a charge transfer substance and a resin binder.

27. A photosensitive element according to claim 26 wherein the thickness of said photosensitive layer is in the range of from about 3μ to about 50μ.

28. A photosensitive element according to claim 26 wherein the amount of said disazo pigment is in the range of from 1 wt.% to 50 wt.% relative to the photosensitive layer and the amount of said charge transfer substance is in the range of from 10 wt.% to 95 wt.% relative to the photosensitive layer.

29. A photosensitive element according to claim 26 wherein A represents

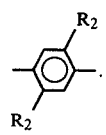

30. A photosensitive element according to claim 26 wherein A represents

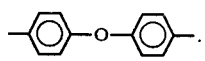

31. A photosensitive element according to claim 26 wherein the compound expressed by the general formula is

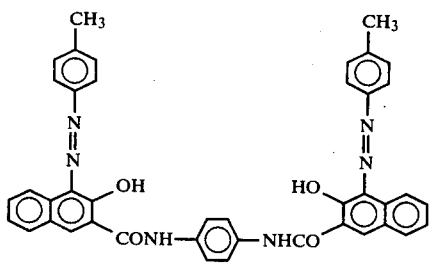

32. A photosensitive element according to claim 26 wherein the compound expressed by the general formula is

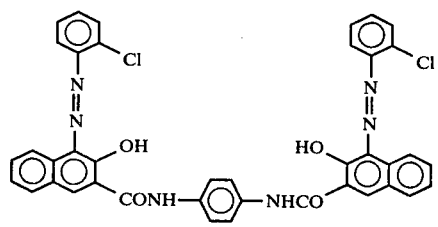

33. A photosensitive element according to claim 26 wherein the compound expressed by the general formula is

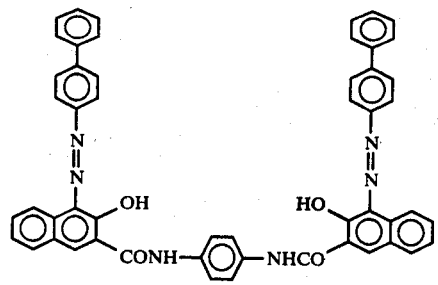

34. A photosensitive element according to claim 26 wherein the compound expressed by the general formula is

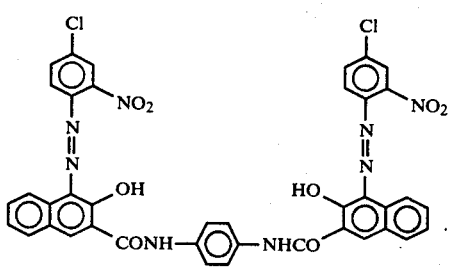

35. A photosensitive element according to claim 26 wherein the compound expressed by the general formula is

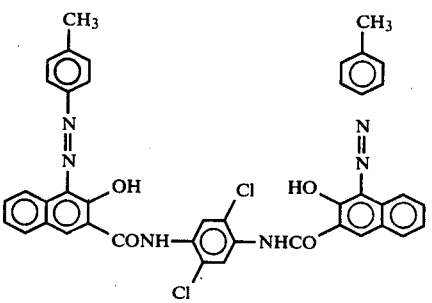

36. A photosensitive element according to claim 26 wherein the compound expressed by the general formula is

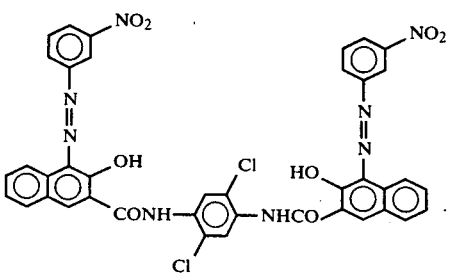

37. A photosensitive element according to claim 26 wherein the compound expressed by the general formula is

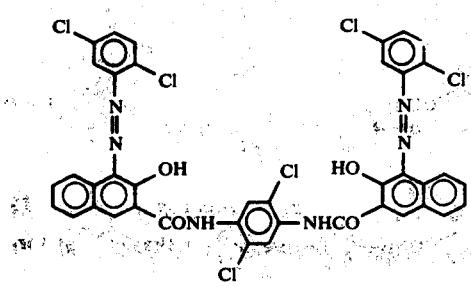

38. A photosensitive element according to claim 26 wherein the compound expressed by the general formula is

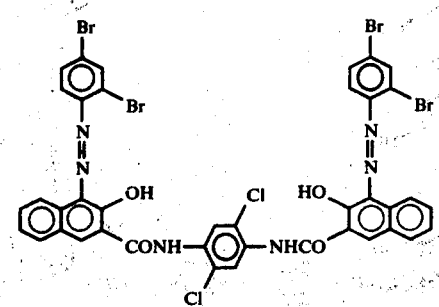

39. A photosensitive element according to claim 26 wherein the compound expressed by the general formula is

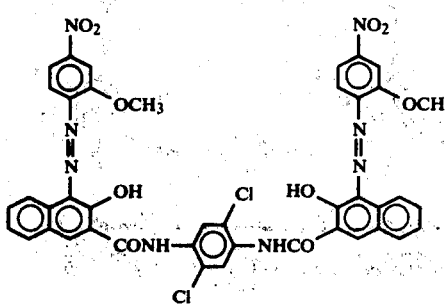

40. A photosensitive element according to claim 26 wherein the compound expressed by the general formula is

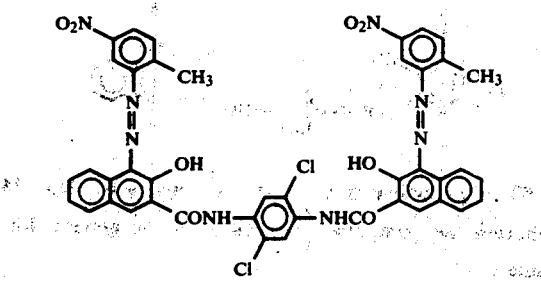

41. A photosensitive element according to claim 26 wherein the compound expressed by the general formula is

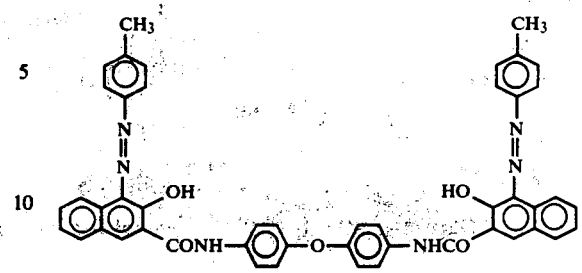

42. A photosensitive element according to claim 26 wherein the compound expressed by the general formula is

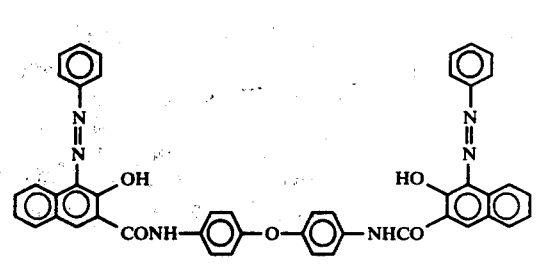

43. A photosensitive element according to claim 26 wherein the compound expressed by the general formula is

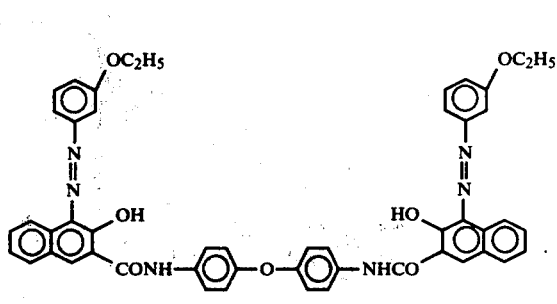

44. A photosensitive element according to claim 26 wherein the compound expressed by the general formula is

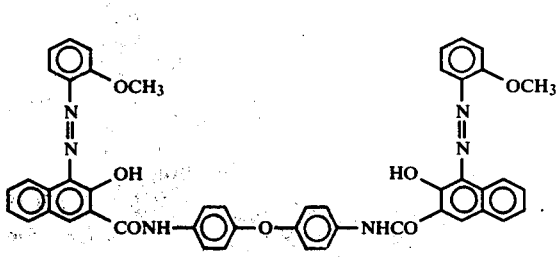

45. A photosensitive element according to claim 26 wherein the compound expressed by the general formula is

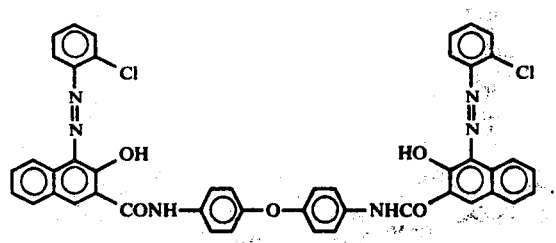

46. A photosensitive element according to claim 26 wherein the compound expressed by the general formula is

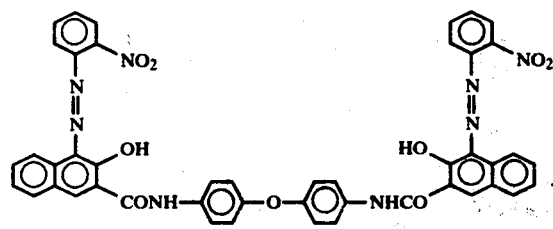

47. A photosensitive element according to claim 26 wherein the compound expressed by the general formula is

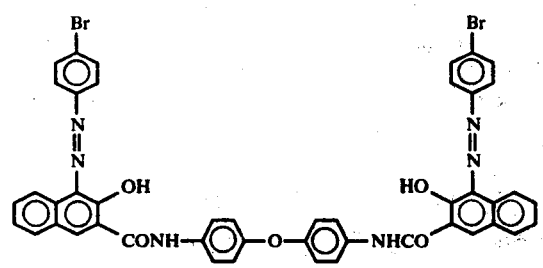

48. A photosensitive element according to claim 26 wherein the compound expressed by the general formula is

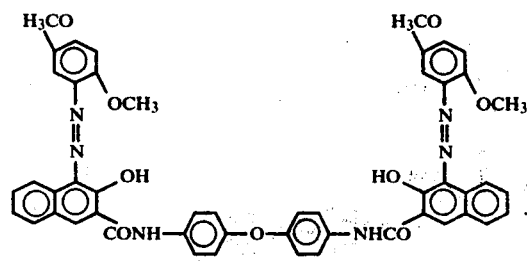

49. A photosensitive element according to claim 26 wherein the compound expressed by the general formula is

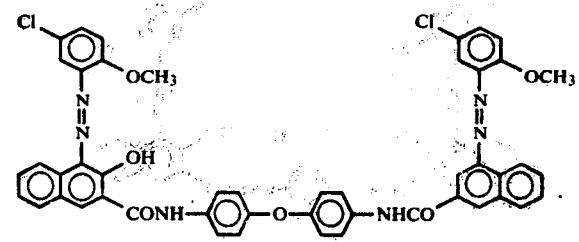

50. A photosensitive element according to claim 26 wherein the compound expressed by the general formula is

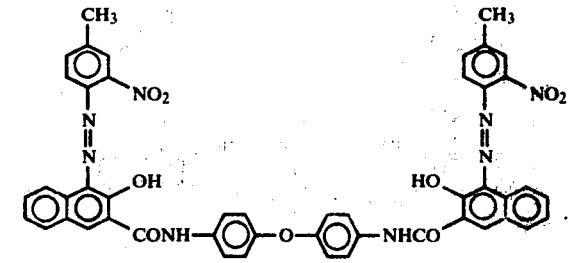

51. A photosensitive element according to claim 26 wherein the compound expressed by the general formula is

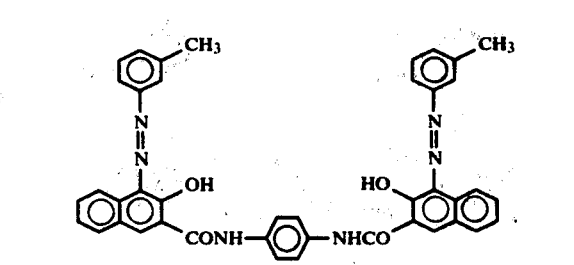

52. A photosensitive element according to claim 26 wherein the compound expressed by the general formula is

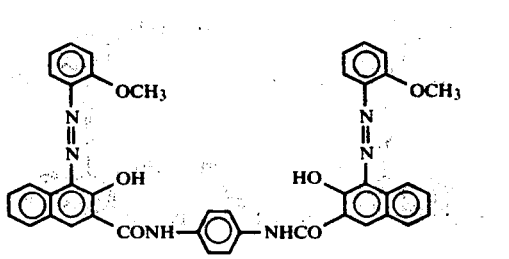

53. A photosensitive element according to claim 26 wherein the compound expressed by the general formula is

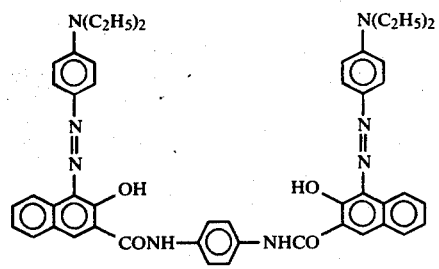

54. A photosensitive element according to claim 26 wherein the compound expressed by the general formula is

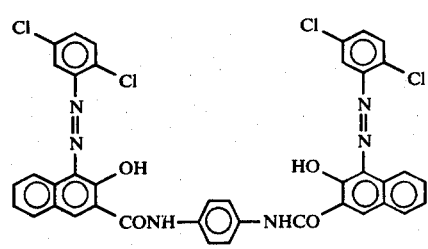

55. A photosensitive element according to claim 26 wherein the compound expressed by the general formula is

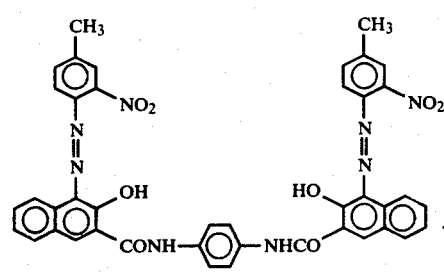

56. A photosensitive element according to claim 26 wherein the compound expressed by the general formula is

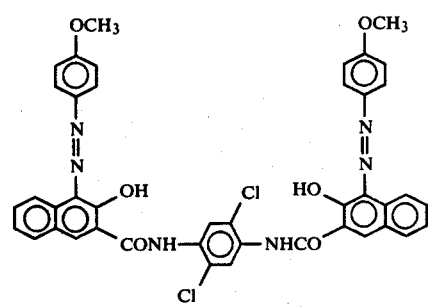

57. A photosensitive element according to claim 26 wherein the compound expressed by the general formula is

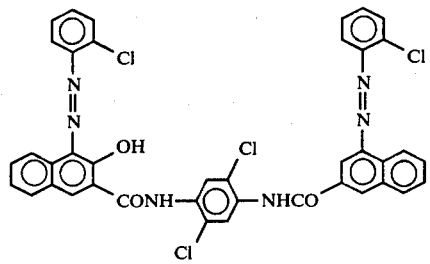

58. A photosensitive element according to claim 26 wherein the compound expressed by the general formula is

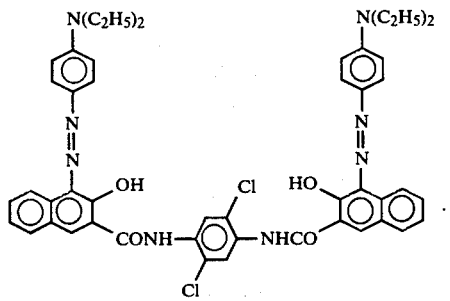

59. A photosensitive element according to claim 26 wherein the compound expressed by the general formula is

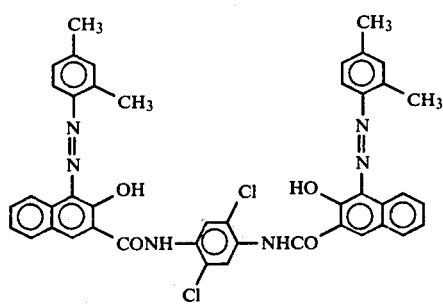

60. A photosensitive element according to claim 26 wherein the compound expressed by the general formula is

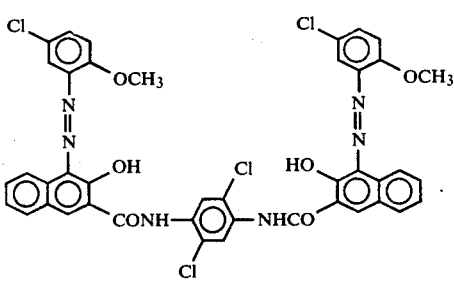

61. A photosensitive element according to claim 26 wherein the compound expressed by the general formula is

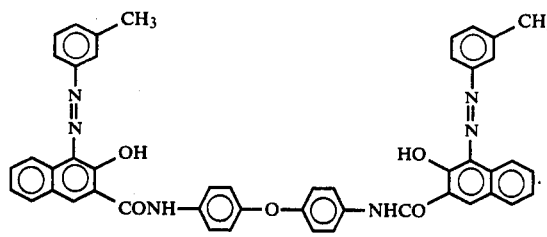

62. A photosensitive element according to claim 26 wherein the compound expressed by the general formula is

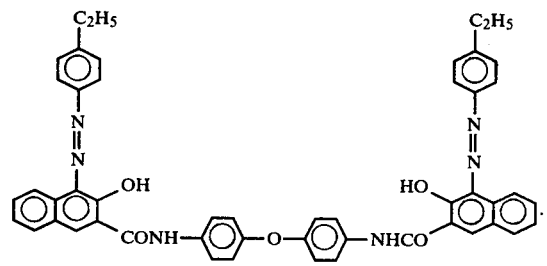

63. A photosensitive element according to claim 26 wherein the compound expressed by the general formula is

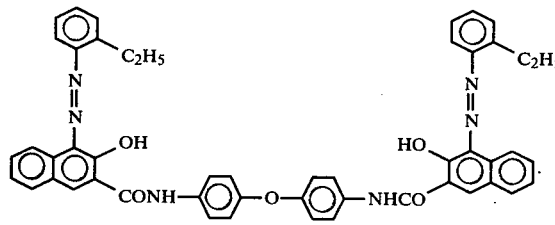

64. A photosensitive element according to claim 26 wherein the compound expressed by the general formula is

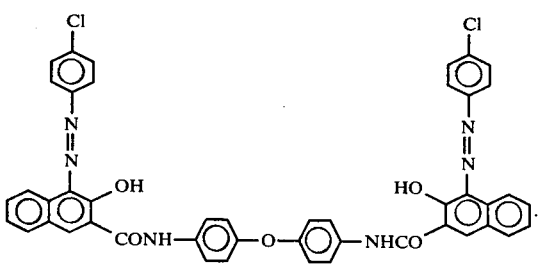

65. A photosensitive element according to claim 26 wherein the compound expressed by the general formula is

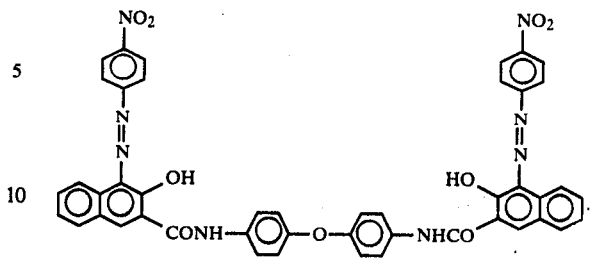

66. A photosensitive element according to claim 26 wherein the compound expressed by the general formula is

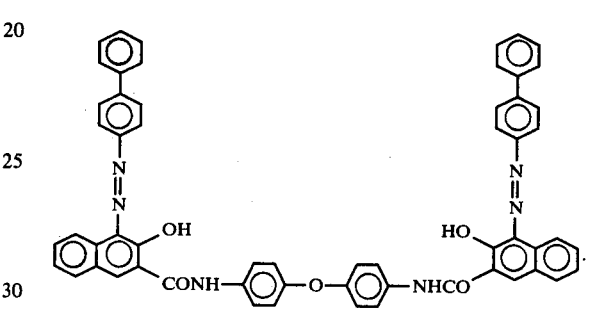

67. A photosensitive element according to claim 26 wherein the compound expressed by the general formula is

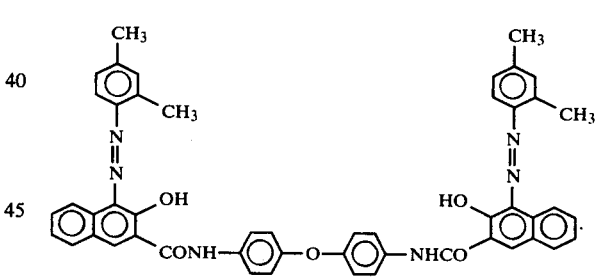

68. A photosensitive element according to claim 26 wherein the compound expressed by the general formula is

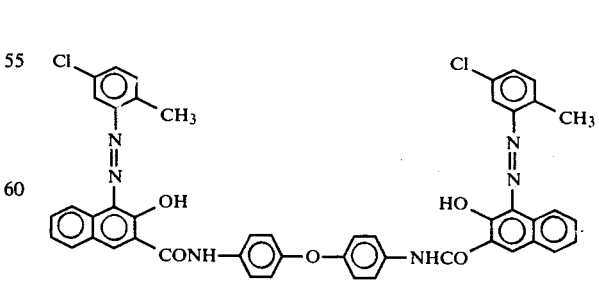

69. A photosensitive element according to claim 26 wherein the compound expressed by the general formula is

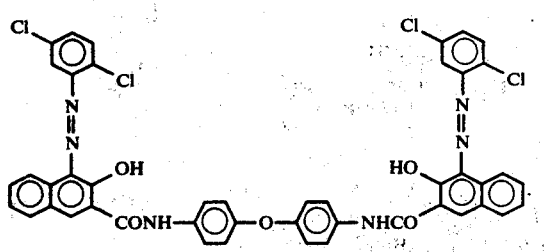

70. A photosensitive material according to claim 26 wherein the compound expressed by the general formula is

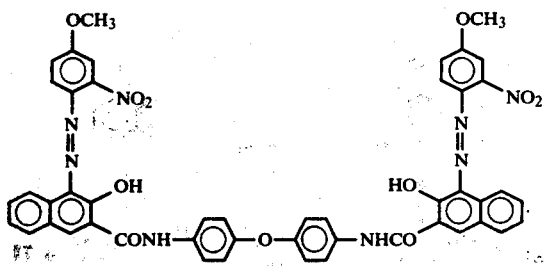

71. A photosensitive element for use in electrophotography which comprises an electroconductive support on which there is a charge-carrier generating layer consisting essentially of a disazo pigment expressed by the general formula

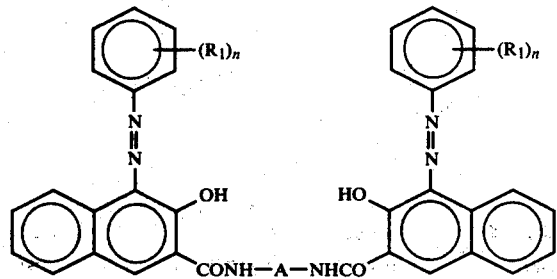

[wherein $R_1$ represents a member selected from the group consisting of hydrogen atom, methyl radical, ethyl radical, methoxy radical, ethoxy radical, chlorine atom, bromine atom, nitro radical, dimethylamino radical, diethylamino radical and phenyl radical; A represents

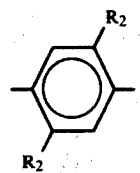

(wherein $R_2$ represents hydrogen atom or chlorine atom) or

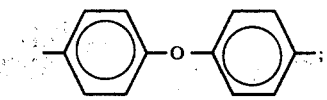

and n is an integer of 1 or 2] and a charge transfer layer consisting essentially of a charge-transfer substance and a resin binder.

72. A photosensitive element according to claim 71 wherein the thickness of said charge-carrier generating layer is in the range of from about $0.01\mu$ to about $5\mu$, and the thickness of said charge-transfer layer is in the range of from about $3\mu$ to about $50\mu$.

73. A photosensitive element according to claim 71 wherein the amount of said charge-transfer substance is in the range of from 10 wt.% to 95 wt.% relative to the charge-transfer layer.

74. A photosensitive element according to claim 71 wherein A represents

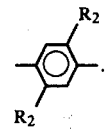

75. A photosensitive element according to claim 71 wherein A represents

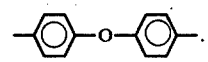

76. A photosensitive element according to claim 71 wherein the compound expressed by the general formula is

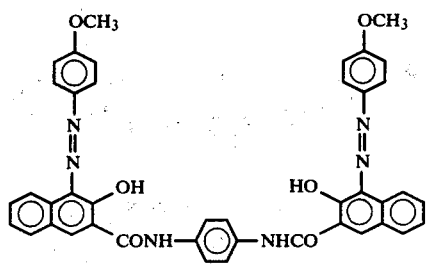

77. A photosensitive element according to claim 71 wherein the compound expressed by the general formula is

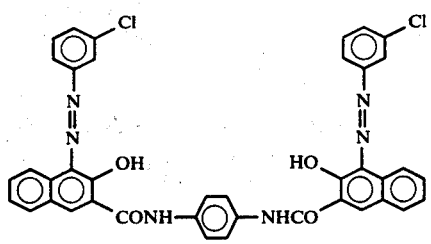

78. A photosensitive element according to claim 71 wherein the compound expressed by the general formula is

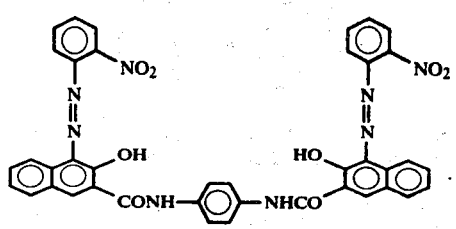

79. A photosensitive element according to claim 71 wherein the compound expressed by the general formula is

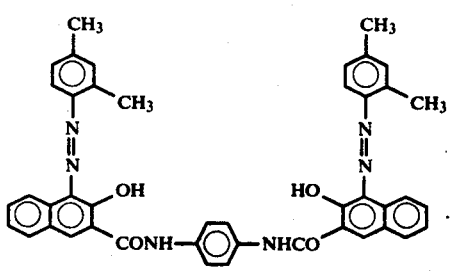

80. A photosensitive element according to claim 71 wherein the compound expressed by the general formula is

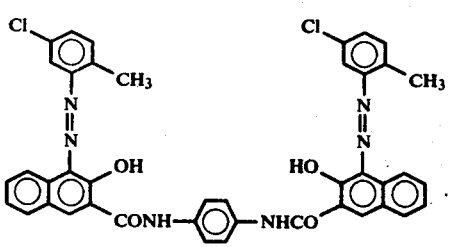

81. A photosensitive element according to claim 71 wherein the compound expressed by the general formula is

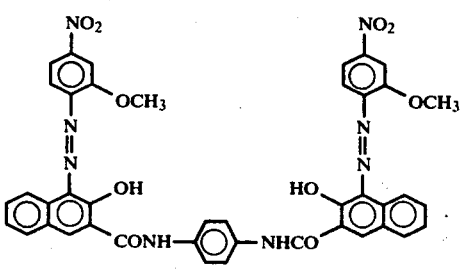

82. A photosensitive element according to claim 71 wherein the compound expressed by the general formula is

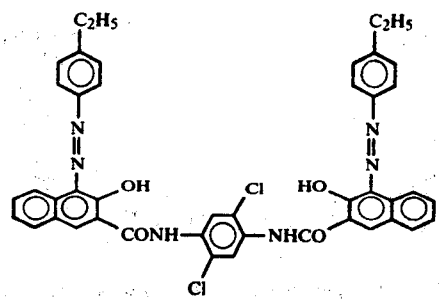

83. A photosensitive element according to claim 71 wherein the compound expressed by the general formula is

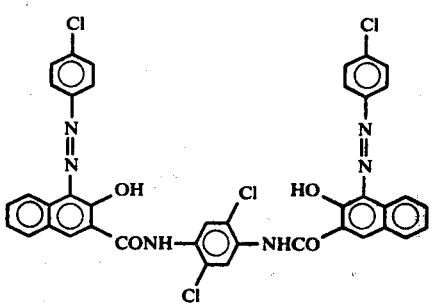

84. A photosensitive element according to claim 71 wherein the compound expressed by the general formula is

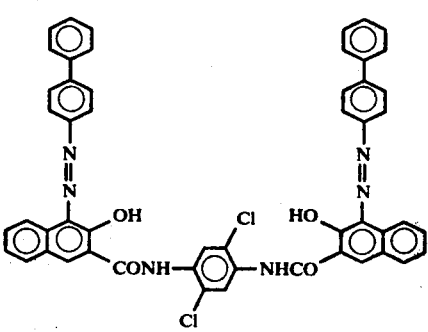

85. A photosensitive element according to claim 71 wherein the compound expressed by the general formula is

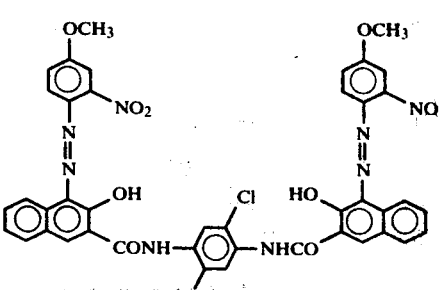

86. A photosensitive element according to claim 71 wherein the compound expressed by the general formula is

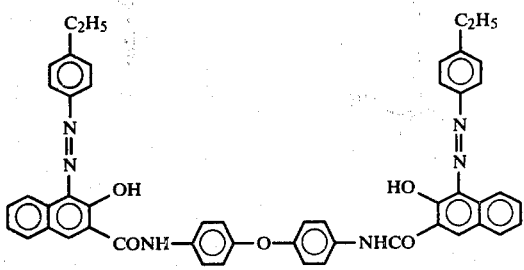

87. A photosensitive element according to claim 71 wherein the compound expressed by the general formula is

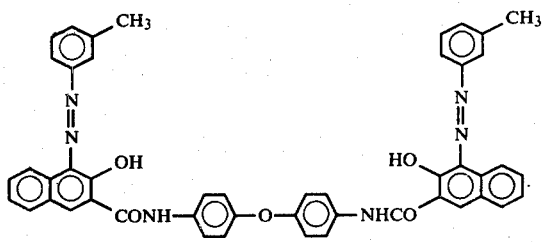

88. A photosensitive element according to claim 71 wherein the compound expressed by the general formula is

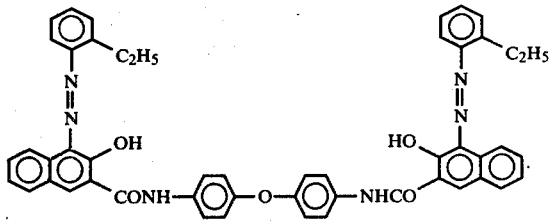

89. A photosensitive element according to claim 71 wherein the compound expressed by the general formula is

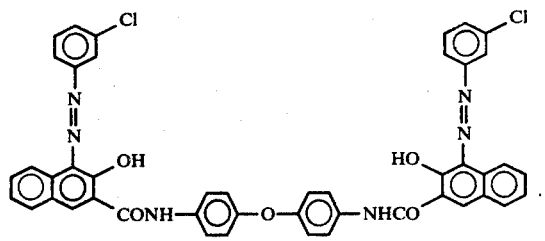

90. A photosensitive element according to claim 71 wherein the compound expressed by the general formula is

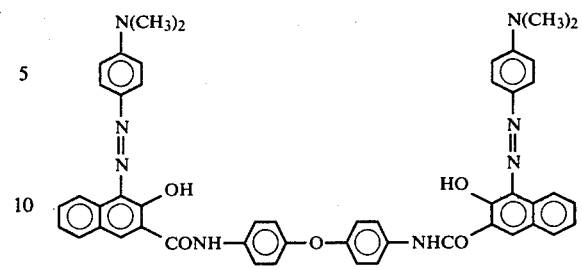

91. A photosensitive element according to claim 71 wherein the compound expressed by the general formula is

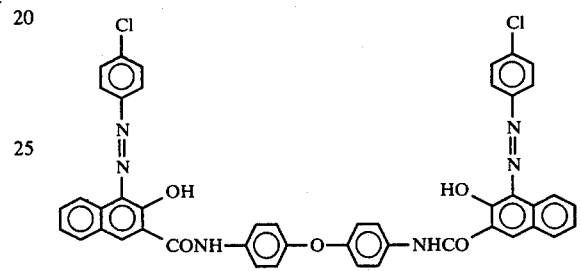

92. A photosensitive element according to claim 71 wherein the compound expressed by the general formula is

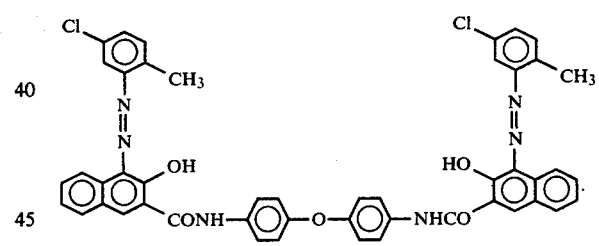

93. A photosensitive element according to claim 71 wherein the compound expressed by the general formula is

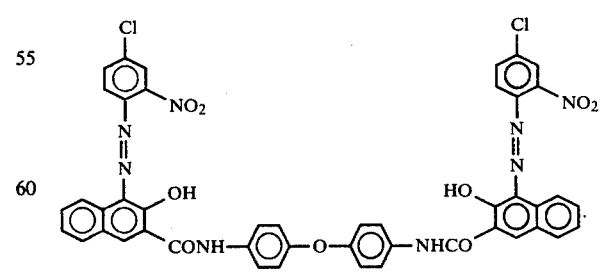

94. A photosensitive element according to claim 71 wherein the compound expressed by the general formula is

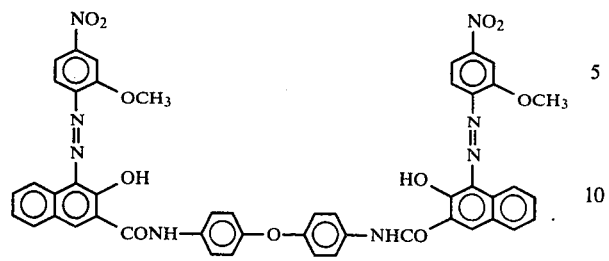

95. A photosensitive element according to claim 71 wherein the compound expressed by the general formula is

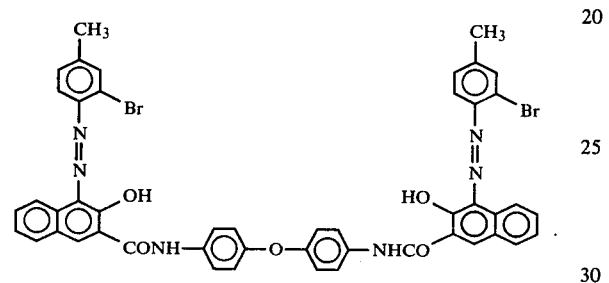

96. A photosensitive element according to claim 71 wherein the compound expressed by the general formula is

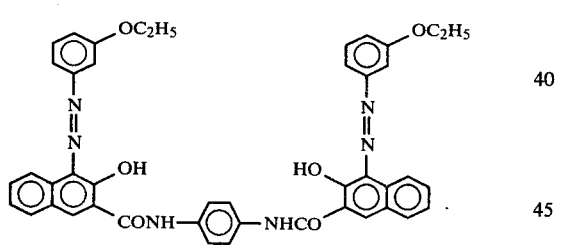

97. A photosensitive element according to claim 71 wherein the compound expressed by the general formula is

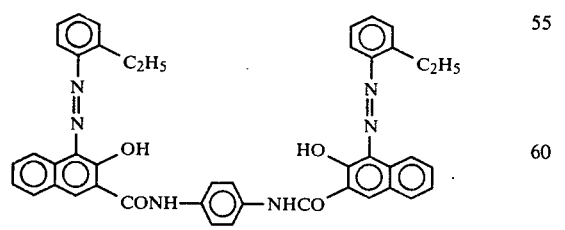

98. A photosensitive element according to claim 71 wherein the compound expressed by the general formula is

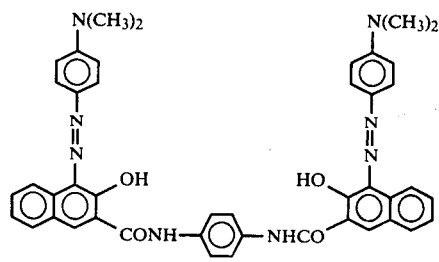

99. A photosensitive element according to claim 71 wherein the compound expressed by the general formula is

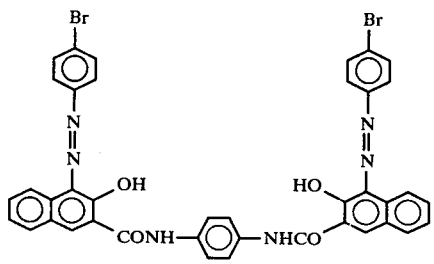

100. A photosensitive element according to claim 71 wherein the compound expressed by the general formula is

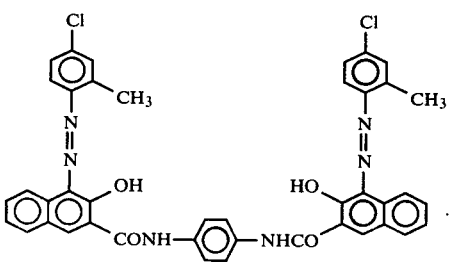

101. A photosensitive element according to claim 71 wherein the compound expressed by the general formula is

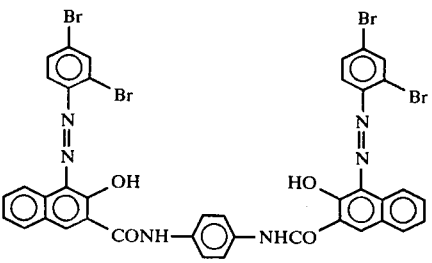

102. A photosensitive element according to claim 71 wherein the compound expressed by the general formula is

103. A photosensitive element according to claim 71 wherein the compound expressed by the general formula is

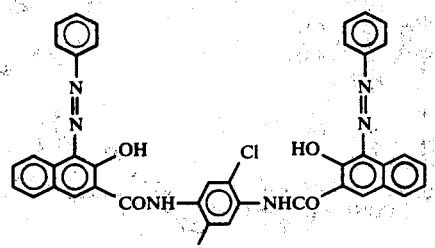

104. A photosensitive element according to claim 71 wherein the compound expressed by the general formula is

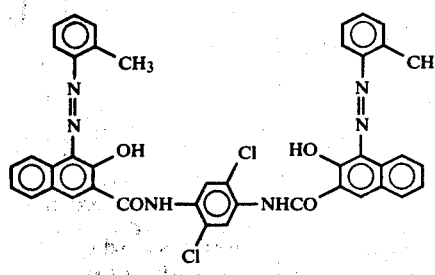

105. A photosensitive element according to claim 71 wherein the compound expressed by the general formula is

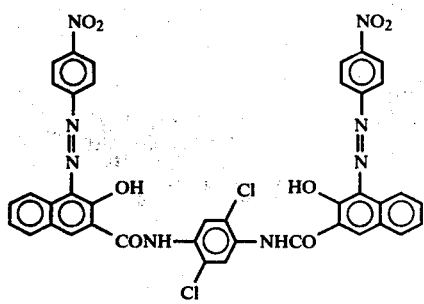

106. A photosensitive element according to claim 71 wherein the compound expressed by the general formula is

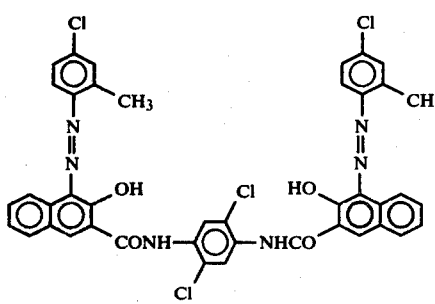

107. A photosensitive element according to claim 71 wherein the compound expressed by the general formula is

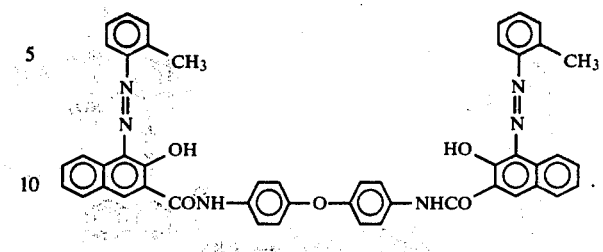

108. A photosensitive element according to claim 71 wherein the compound expressed by the general formula is

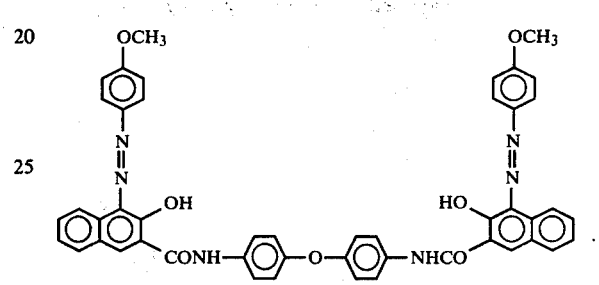

109. A photosensitive element according to claim 71 wherein the compound expressed by the general formula is

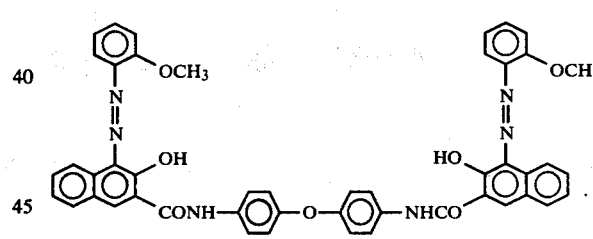

110. A photosensitive element according to claim 71 wherein the compound expressed by the general formula is

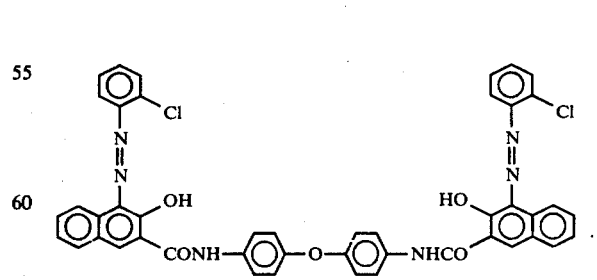

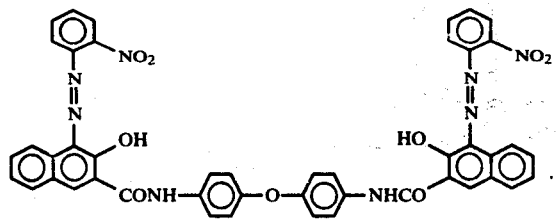

111. A photosensitive element according to claim 71 wherein the compound expressed by the general formula is

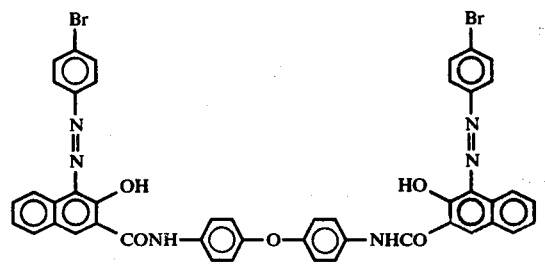

112. A photosensitive element according to claim 71 wherein the compound expressed by the general formula is

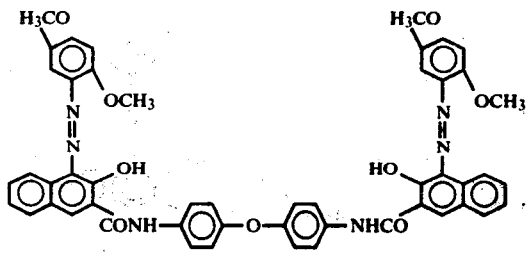

113. A photosensitive element according to claim 71 wherein the compound expressed by the general formula is

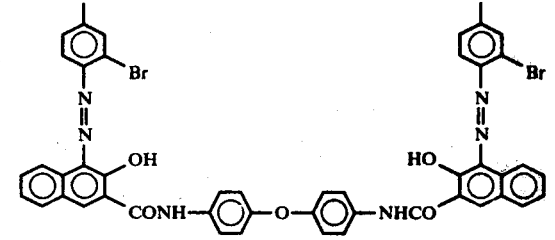

114. A photosensitive element according to claim 71 wherein the compound expressed by the general formula is

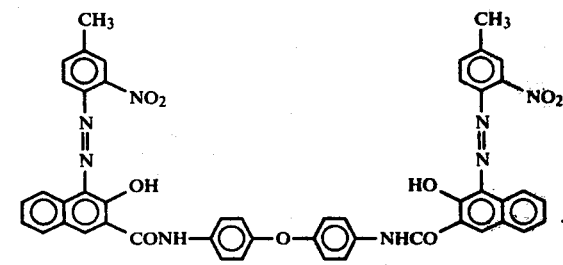

* * * * *

UNITED STATES PATENT OFFICE
CERTIFICATE OF CORRECTION

Patent No. 4 247 614　　　　　　　　Dated January 27, 1981

Inventor(s) Masafumi Ohta et al

It is certified that error appears in the above-identified patent and that said Letters Patent are hereby corrected as shown below:

Column 36, lines 1-10;　please delete the formula and replace by the following:

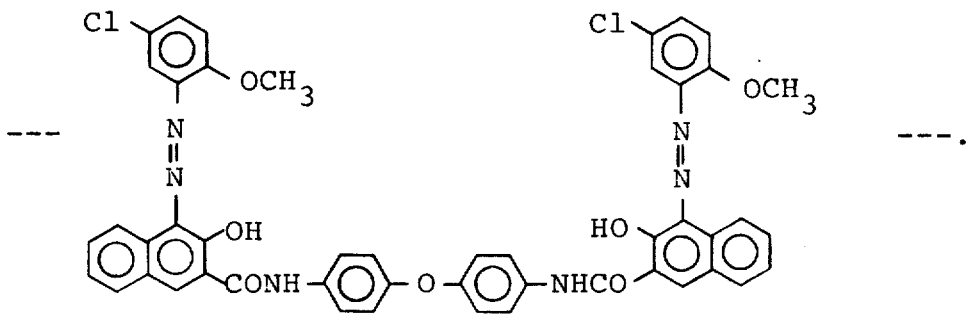

UNITED STATES PATENT OFFICE
CERTIFICATE OF CORRECTION

Patent No. 4,247,614        Dated January 27, 1981

Inventor(s)  Masafumi Ohta et al

It is certified that error appears in the above-identified patent and that said Letters Patent are hereby corrected as shown below:

Column 38, lines 1-10; please delete the formula and replace by the following:

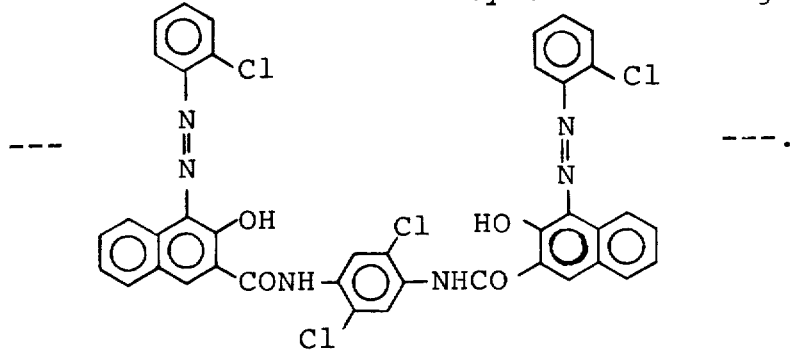

Signed and Sealed this

Fifth Day of May 1981

[SEAL]

Attest:

RENE D. TEGTMEYER

Attesting Officer          Acting Commissioner of Patents and Trademarks